(12) United States Patent
Nguyen et al.

(10) Patent No.: US 11,989,540 B2
(45) Date of Patent: May 21, 2024

(54) SYSTEMS AND METHODS FOR NON-DISRUPTIVE CONTINUOUS SOFTWARE DELIVERY

(71) Applicant: CloudBees, Inc., San Jose, CA (US)

(72) Inventors: Tien Nguyen, Morgan Hill, CA (US); Pinaki Sarkar, Milpitas, CA (US); Ping Ma, San Jose, CA (US); Dong Hoang, San Jose, CA (US); Basheer Janjua, Half Moon Bay, CA (US); Scott Trimber, Sunnyvale, CA (US)

(*) Notice: Subject to any disclaimer, the term of this patent is extended or adjusted under 35 U.S.C. 154(b) by 0 days.

(21) Appl. No.: 18/081,692

(22) Filed: Dec. 15, 2022

(65) Prior Publication Data

US 2023/0195441 A1 Jun. 22, 2023

Related U.S. Application Data

(63) Continuation of application No. 16/303,070, filed as application No. PCT/US2017/033647 on May 19, 2017, now Pat. No. 11,531,528.

(60) Provisional application No. 62/338,998, filed on May 19, 2016.

(51) Int. Cl.
| | |
|---|---|
| *G06F 8/61* | (2018.01) |
| *G06F 8/60* | (2018.01) |
| *G06F 8/65* | (2018.01) |
| *G06F 9/445* | (2018.01) |
| *G06F 9/455* | (2018.01) |

(52) U.S. Cl.
CPC .................................... *G06F 8/60* (2013.01)

(58) Field of Classification Search
CPC ............ G06N 20/00; G06N 3/08; G06N 3/04; G06N 3/063; G06N 5/025; G06N 5/022; G06N 20/20; G10L 17/18; G06F 18/214; G06F 8/60; G06F 8/72; G06F 8/71; G06F 8/443; G06F 9/44505; G06F 8/433; G06F 8/30; G06F 9/54; G06F 8/36
See application file for complete search history.

(56) References Cited

U.S. PATENT DOCUMENTS

| | | | | |
|---|---|---|---|---|
| 10,120,668 B2* | 11/2018 | Palavalli | ................... | G06F 8/60 |
| 10,656,927 B2* | 5/2020 | Hawrylo | ................... | G06F 8/60 |

* cited by examiner

*Primary Examiner* — Thuy Dao
(74) *Attorney, Agent, or Firm* — Patent GC LLC; Alexander Franco

(57) ABSTRACT

A method for continuous software delivery includes: receiving user selections of a first and second segments of a plurality of continuous delivery segments; generating a first toolchain including a plurality of tools configured based on one or more toolchain rules without input from a user; determining a segment dependency between the first segment and the second segment in response to the second user input; generating and executing an instance of a continuous delivery pipeline model including at least the first segment and the second segment; triggering at least a portion of the first toolchain to perform a continuous delivery action associated with the continuous delivery pipeline model; automatically reconfiguring one or more of the plurality of tools based on the one or more retrieved configuration rules; and performing an adjustment to the toolchain in response to the automatically reconfiguring one or more of the plurality of tools.

20 Claims, 14 Drawing Sheets

SYSTEMS AND METHODS FOR NON-DISRUPTIVE CONTINUOUS SOFTWARE DELIVERY

RELATED APPLICATIONS

The subject matter of this application is related to U.S. Utility patent application Ser. No. 16/303,070, filed on 2018 Nov. 19, now U.S. Pat. No. 11,531,528, Patent Cooperation Treaty Application PCT/US2017/0336476, filed on 2017 May 19, and U.S. Provisional Application No. 62/338,998, filed on 2016 May 19, all of which applications are hereby incorporated by reference.

BACKGROUND

Technical Field

Embodiments of the present invention relate generally to software development. More specifically, embodiments of the present inventions relate to non-disruptive continuous software delivery.

Description of Related Art

Software development is a time consuming and resource intensive process. Traditionally, software development has been broken down into several distinct stages, such as a specification or requirements stage, a design stage, a construction stage, and a production stage. Each stage can last weeks, months, or even years. Software development practices have recently begun to evolve to address such lengthy development lifecycles, however current solutions (e.g., software development platforms) have failed to provide the technical features required to rapidly create, test, and deploy software applications.

SUMMARY

Some embodiments described herein include systems and methods for non-disruptive continuous software delivery. For example, a system can create a continuous delivery pipeline model that can be executed in response to one or more trigger events (e.g., a source code commit event). Depending upon product requirements or objectives, the continuous delivery pipeline model can be created from a predetermined (or, "template") model, or created from scratch. For example, the system can generate a graphical user interface (GUI) that presents various pipeline segments, such as a continuous integration (CI) segment, a function test (FT) segment, a user acceptance test (UAT) segment, a performance test (PT) segment, a static security scan (SSC) segment, a dynamic security scan (DSS) segment, a system integration (SI) segment a production (PROD) segment, and the like. Pipeline segments can be selected, or otherwise manipulated, or arranged, through the GUI to create (or, "define") the continuous delivery pipeline model.

In some embodiments, execution of a continuous delivery pipeline model triggers one or more software development tools (or, "tools") to perform continuous delivery actions (or, "actions"). For example, the tools can include a source code repository tool, a binary repository tool, an issue tracking tool, a project management tool, and a code quality tool. Similarly, actions can include CI actions (e.g., cloning a portion of the source code repository), PT actions, and so forth. In various embodiments, predefined tool configuration rules can automatically configure such tools, which can, for example, reduce the software development lifecycle times. In some embodiments, source code and/or artifacts can be advanced through a continuous delivery pipeline based on segment dependencies and threshold values defined by the continuous delivery pipeline model. For example, a particular continuous delivery pipeline model can define that an artifact is advanced to a next pipeline segment only if all of the actions (e.g., tests) associated with a current pipeline segment are passed.

In some embodiments, the system includes tool adapters that allow the system to trigger, and otherwise communicate with, a variety of different types of tools (e.g., a source code repository), regardless of the particular tool implementation (e.g., Jenkins, Stash, Bitbucket, Gitlab, Github, etc.). In various embodiments, the tool adapters further allow tools to be swapped out "on the fly," or "non-disruptively," e.g., without substantially impacting system performance and/or development lifecycle times.

In various embodiments, a system comprises a configurator interface engine configured to cooperate with a processor to (i) generate a graphical interface presenting a plurality of continuous delivery segments, (ii) receive, through the graphical interface, a first user input selecting a first segment of the plurality of continuous delivery segments, and (iii) receive, through the graphical interface, a second user input selecting a second segment of the plurality of continuous delivery segments. A configurator engine may (i) configure a plurality of tools based on one or more toolchain rules, the plurality of tools being configured without requiring input from a user, (ii) generate a toolchain comprising the plurality of tools after the configuration, (iii) determine a segment dependency between the first segment and the second segment in response to the second user input, and (iv) generate a continuous delivery pipeline model based on the first user input, the second user input, and the segment dependency, the continuous delivery pipeline model including at least the first segment and the second segment. An orchestrator engine may execute an instance of the continuous delivery pipeline model, and a non-disruptive toolchain engine may (i) trigger at least a portion of the toolchain to perform a continuous delivery action associated with the continuous delivery pipeline model in response to the execution, and (ii) permit a non-disruptive adjustment of the toolchain.

In some embodiments, the plurality of continuous delivery segments are each configured to trigger one or more corresponding continuous delivery actions.

In some embodiments, the plurality of continuous delivery segments include any of a continuous integration segment, a functional test segment, a static security scan segment, a dynamic security scan segment, a system integration segment, a user acceptance testing segment, and a production segment.

In some embodiments, the plurality of tools include any of a source code repository tool, a binary repository tool, an issue tracking tool, a project management tool, and a code quality tool.

In some embodiments, the continuous delivery pipeline model comprises a directed node graph. In related embodiments, the first segment comprises a first node of the directed node graph, and the second segment comprises a second node of the directed node graph. In related embodiments, a first edge of the directed node graph comprises the segment dependency between the first segment and the second segment. In related embodiments, the configurator interface engine is configured to display a visual representation of the directed node graph in response to receiving the second user input.

In some embodiments, the segment dependency is determined based on a third user input received by the configurator interface engine through the graphical interface.

In some embodiments, the segment dependency is determined without requiring user input.

In various embodiments, a method comprises generating, by a non-disruptive continuous delivery system, a graphical interface presenting a plurality of continuous delivery segments. A first user input may be received, the first user input selecting a first segment of the plurality of continuous delivery segments. A second user input may be received, the second user input selecting a second segment of the plurality of continuous delivery segments. A plurality of tools may be configured based on one or more toolchain rules, the plurality of tools being configured without requiring input from a user. A first toolchain may be generated comprising the plurality of tools after the configuration. A segment dependency may be determined between the first segment and the second segment in response to the second user input. A continuous delivery pipeline model may be generated based on the first user input, the second user input, and the segment dependency, the continuous delivery pipeline model including at least the first segment and the second segment. An instance of the continuous delivery pipeline model may be executed, thereby triggering at least a portion of the first toolchain to perform one or more actions associated with the continuous delivery pipeline model. A non-disruptive adjustment of the first toolchain may be permitted.

In some embodiments, the method may further comprise adjusting, by the non-disruptive continuous delivery system, the toolchain without requiring an interruption of a user workflow, thereby generating a second toolchain; second executing, by the non-disruptive continuous delivery system, the instance of the continuous delivery pipeline model; and triggering, by the non-disruptive continuous delivery system, at least a portion of the second toolchain in response to the second executing the instance of the continuous delivery pipeline model.

In some embodiments, the continuous delivery pipeline model comprises a directed node graph. In related embodiments, the first segment comprises a first node of the directed node graph, and the second segment comprises a second node of the directed node graph. In related embodiments, a first edge of the directed node graph comprises the segment dependency between the first segment and the second segment. In related embodiments, the configurator interface engine is configured to display a visual representation of the directed node graph in response to receiving the second user input.

In some embodiments, the segment dependency is determined based on a third user input received by the configurator interface engine through the graphical interface.

In some embodiments, the segment dependency is determined without requiring user input.

In various embodiments, a non-transitory computer readable medium comprises executable instructions, the instructions being executable by a processor to perform a method, the method comprising a graphical interface presenting a plurality of continuous delivery segments. A first user input may be received, the first user input selecting a first segment of the plurality of continuous delivery segments. A second user input may be received, the second user input selecting a second segment of the plurality of continuous delivery segments. A plurality of tools may be configured based on one or more toolchain rules, the plurality of tools being configured without requiring input from a user. A first toolchain may be generated comprising the plurality of tools after the configuration. A segment dependency may be determined between the first segment and the second segment in response to the second user input. A continuous delivery pipeline model may be generated based on the first user input, the second user input, and the segment dependency, the continuous delivery pipeline model including at least the first segment and the second segment. An instance of the continuous delivery pipeline model may be executed, thereby triggering at least a portion of the first toolchain to perform one or more actions associated with the continuous delivery pipeline model. A non-disruptive adjustment of the first toolchain may be permitted.

DETAILED DESCRIPTION

Some embodiments described herein include systems and methods for non-disruptive continuous software delivery.

For example, a system can create a continuous delivery pipeline model that can be executed in response to one or more trigger events (e.g., a source code commit event). Depending upon product requirements or objectives, the continuous delivery pipeline model can be created from a predetermined (or, "template") model, or created from scratch. For example, the system can generate a graphical user interface (GUI) that presents various pipeline segments, such as a continuous integration (CI) segment, a function test (FT) segment, a user acceptance test (UAT) segment, a performance test (PT) segment, a static security scan (SSC) segment, a dynamic security scan (DSS) segment, a system integration (SI) segment a production (PROD) segment, and the like. Pipeline segments can be selected, or otherwise manipulated, through the GUI to create (or, "define") the continuous delivery pipeline model.

In some embodiments, execution of a continuous delivery pipeline model triggers one or more software development tools (or, "tools") to perform continuous delivery actions (or, "actions"). For example, the tools can include a source code repository tool, a binary repository tool, an issue tracking tool, a project management tool, and a code quality tool. Similarly, actions can include CI actions (e.g., cloning a portion of the source code repository), PT actions, and so forth. In various embodiments, predefined tool configuration rules can automatically configure such tools, which can, for example, reduce the software development lifecycle times. In some embodiments, source code and/or artifacts can be advanced through a continuous delivery pipeline based on segment dependencies and threshold values defined by the continuous delivery pipeline model. For example, a particular continuous delivery pipeline model can define that an artifact is advanced to a next pipeline segment only if all of the actions (e.g., tests) associated with a current pipeline segment are passed.

In some embodiments, the system includes tool adapters that allow the system to trigger, and otherwise communicate with, a variety of different types of tools (e.g., a source code repository), regardless of the particular tool implementation (e.g., Stash, Bitbucket, etc.). In various embodiments, the tool adapters further allow tools to be swapped out "on the fly," or "non-disruptively," e.g., without substantially impacting system performance and/or development lifecycle times.

Figure 1:
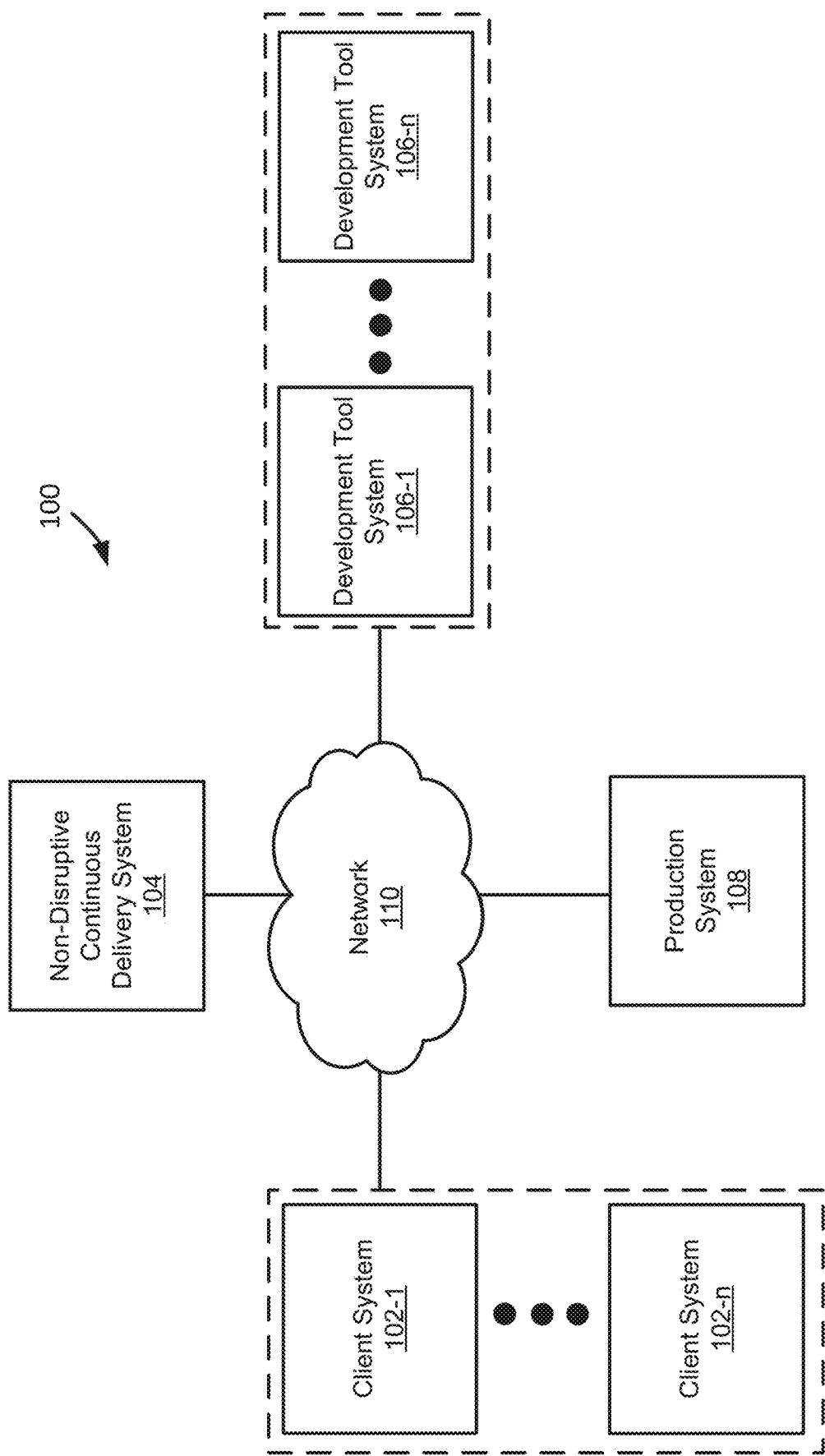
FIG. 1 depicts a block diagram of an example system capable of providing non-disruptive continuous software delivery according to some embodiments.

FIG. 1 depicts a block diagram 100 of an example system capable of providing non-disruptive continuous software delivery according to some embodiments. The example system of FIG. 1 includes client systems 102-1 to 102-n (individually, the client system 102, collectively, the client systems 102), a non-disruptive continuous delivery system 104, development tools 106-1 to 106-n (individually, the development tool 106, collectively, the development tools 106), a production system 108, and a communications network 110.

In the example of FIG. 1, the client systems 102 function to generate source code for software development projects (e.g., an online music store) and applications (e.g., a genre selection feature of the online music store). For example, the functionality of the client systems 102 can be performed by one or more workstations, desktop computers, laptop computers, mobile devices (e.g., smartphone, cell phone, smartwatch, tablet computer, etc.), and the like. In a specific implementation, the client systems 102 function to execute local and/or networked-based applications (e.g., web browsers, remote communication clients, software development platforms and environments, etc.).

In a specific implementation, the client systems 102 function to access or otherwise communicate with one or more of the other systems of FIG. 1. For example, the client systems 102 can receive data from other systems (e.g., to render user interfaces based on received data), display graphics rendered by other systems, transmit data to other systems, and so forth. In various implementations, the user interfaces may be configured to receive user input, e.g., for software development. It will be appreciated that while many client systems 102 may be different, they may also share some common features. For example, the client systems 102 can include some method of capturing user input such as via a keyboard, mouse, touchscreen, touchpad, or the like. The client systems 102 may also have some method of displaying a two-dimensional or three-dimensional images using a display, such as an LED, an LCD, or a touchscreen.

In the example of FIG. 1, the non-disruptive continuous delivery system 104 functions to continuously integrate, build, test, and deploy software in accordance with the teachings herein. For example, the functionality of the non-disruptive continuous delivery system 104 can be performed by one or more computing devices, such as workstations, desktop computers, laptop computers, mobile devices (e.g., smartphone, cell phone, smartwatch, tablet computer, etc.), and the like. In a specific implementation, some or all of the features of the non-disruptive continuous delivery system 104 can be performed by the computing device(s) performing the functionality of a client system 102.

Figure 12:
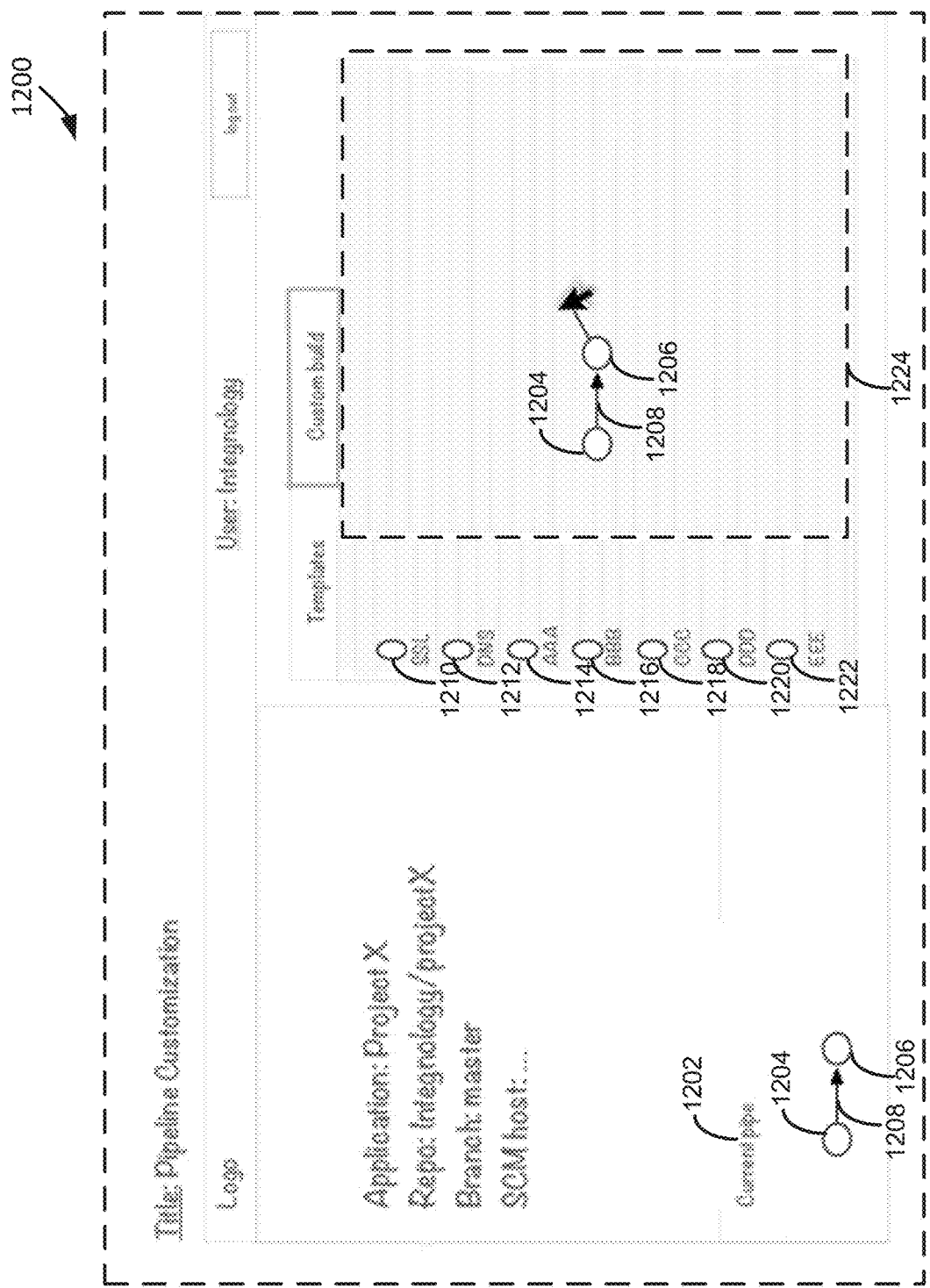
FIG. 12 depicts an example graphical user interface for generating an example continuous delivery pipeline model according to some embodiments.
Figure 13:
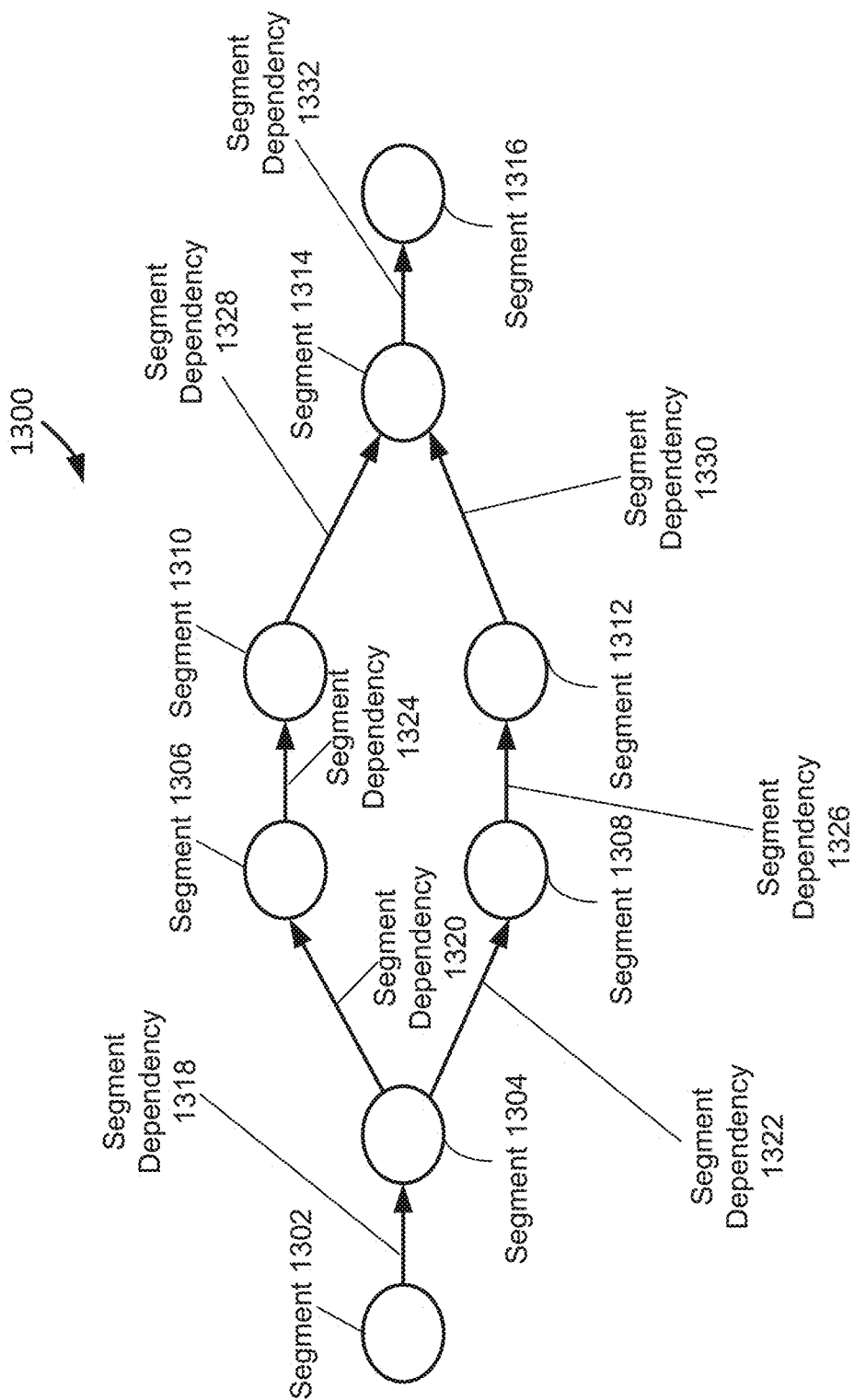
FIG. 13 depicts an example continuous delivery pipeline model according to some embodiments.

In the example of FIG. 1, the non-disruptive continuous delivery system 104 functions to create continuous delivery software development projects (or, "projects"), continuous delivery software development applications (or, "applications"), and continuous delivery pipeline models. For example, a project may comprise an online music store platform, and an application may comprise a genre selection feature of the online music store platform. In a specific implementation, and as discussed elsewhere herein, a continuous delivery pipeline model is comprised of a plurality of pipeline segments. For example, the pipeline segments can define various operations that must be passed in order for artifacts and/or binaries to advance to subsequent pipeline segments, and eventually be deployed to a production system. In a specific implementation, the non-disruptive continuous delivery system 104 additionally functions to provide a graphical user interface for creating projects, application, and continuous delivery pipeline models. An example interface for creating a continuous delivery pipeline model is shown in FIG. 12, and an example continuous delivery pipeline model is shown in FIG. 13.

In the example of FIG. 1, the development tools 106 function to perform a variety of software development actions. For example, the functionality of the development tools 106 can be performed by one or more workstations, desktop computers, laptop computers, mobile devices (e.g., smartphone, cell phone, smartwatch, tablet computer, etc.), and the like. In a specific implementation, the functionality of the development tools 106 can be performed by some or all of the computing devices performing the functionality of the non-continuous delivery system 104. In a specific implementation, the development tools 106 include one or more source code management (SCM) tools, binary repository tools, issue tracking tools, project management tools, and code quality tools, just to name a few.

In the example of FIG. 1, the production system 110 functions to provide a live production environment for the projects and applications to be deployed. For example, the functionality of the production system 110 can be performed by one or more computing devices, such as workstations, desktop computers, laptop computers, mobile devices (e.g., smartphone, cell phone, smartwatch, tablet computer, etc.), and the like. In a specific implementation, the production system 110 comprises a live production environment hosted by a cloud storage service (e.g., AWS, CloudFoundry, Azure, Openstack) and/or other type of storage (e.g., Heritage).

In the example of FIG. 1, the communications network 110 represents one or more computer networks (e.g., LAN, WAN, etc.). The communications network 100 may provide communication between the client systems 102, the non-disruptive continuous delivery system 104, the development tools 106, and the production system 108. In some implementations, the communications network 110 comprises computing devices, routers, cables, buses, and/or other network topologies. In some implementations, the communications network 110 may be wired and/or wireless. In various implementations, the communications network 110 may comprise the Internet, one or more networks that may be public, private, IP-based, non-IP based, and so forth. In a specific implementation, the communications network 110 comprises a cloud-based communications network.

Figure 2:
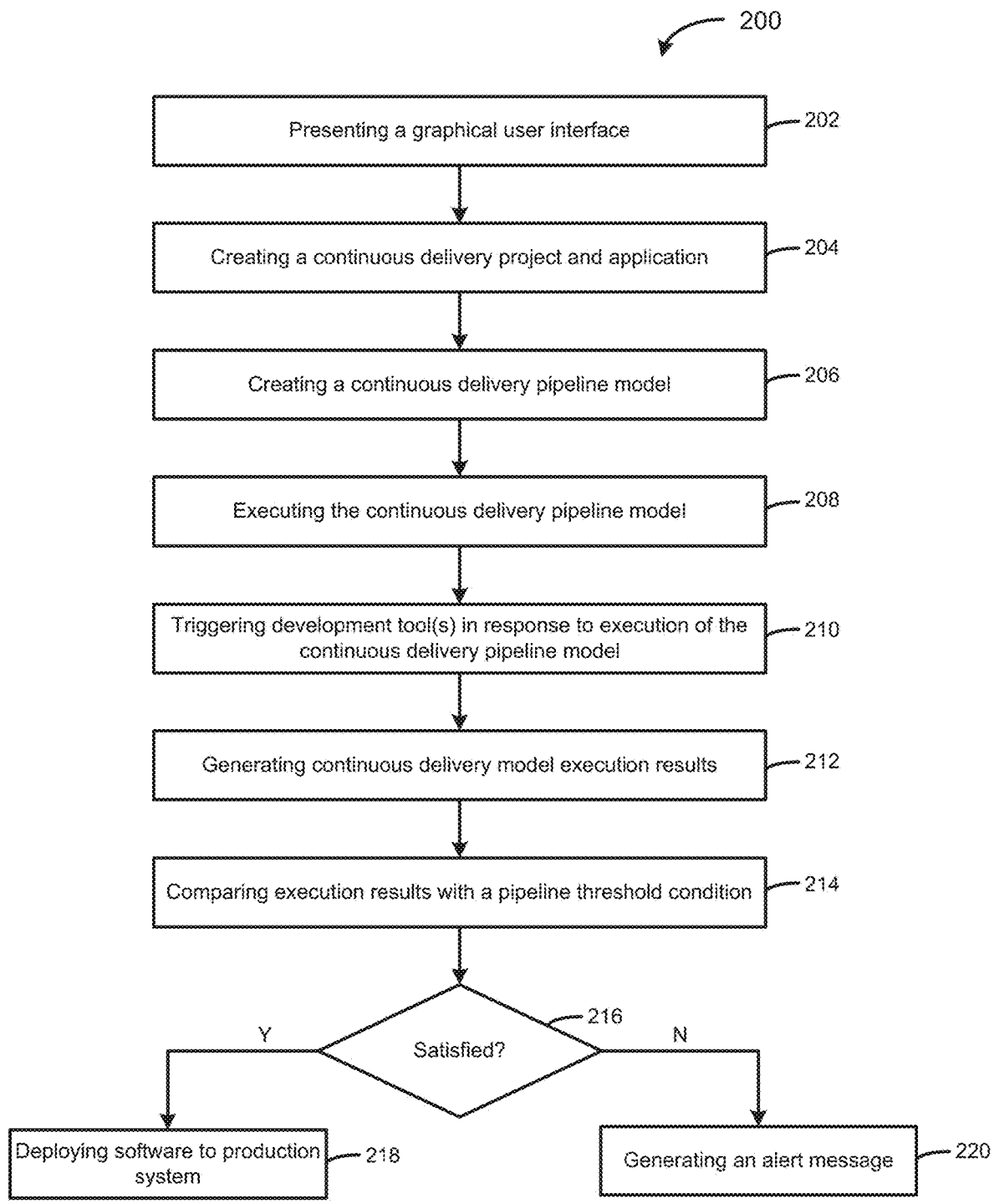
FIG. 2 depicts a flowchart of an example method of operation of a system capable of providing non-disruptive continuous software delivery according to some embodiments.

FIG. 2 depicts a flowchart 200 of an example method of operation of a system capable of providing non-disruptive continuous software delivery according to some embodiments. In this and other flowcharts described in this paper, the flowchart illustrates by way of example a sequence of steps. It should be understood the steps can be reorganized for parallel execution, or reordered, as applicable. Moreover, some steps that could have been included may have been removed to avoid providing too much information for the sake of clarity and some steps that were included could be removed, but may have been included for the sake of illustrative clarity.

In step 202, a client computer system presents a graphical user interface (GUI) for creating a project, an application, and a continuous delivery pipeline model. In a specific implementation, the GUI elements are generated remote from the computer system (e.g., a the non-disruptive continuous delivery system) and rendered locally (e.g., by a web browser or other client presentation application). In other implementations, some or all of the GUI elements are generated and rendered locally. An example GUI for creating a continuous delivery pipeline is shown in FIG. 12.

In step 204, the non-disruptive continuous delivery system creates the project and application. In a specific implementation, the project and application are created in response to, and based on, user input received through the GUI. For example, the user can include a project name, an application name, selected development tools to include the project and application configurations, and so forth.

In step 206, the non-disruptive continuous delivery system creates a continuous delivery pipeline model associated with the application. In a specific implementation, the continuous delivery pipeline model can be created in response to, and based on, user input received through the GUI. For example, the user input can include pipeline segment selections. An example continuous delivery model is shown in FIG. 13.

In step 208, the non-disruptive continuous delivery system executes the continuous delivery pipeline model for the associated application, or portion thereof. In a specific implementation, the continuous delivery pipeline model can be executed in response to a trigger event (e.g., a source code commit event). In a specific implementation, the continuous delivery pipeline model can receive source code associated with the trigger event as an input.

In step 210, the non-disruptive continuous delivery system triggers one or more development tools to perform one or more continuous delivery actions in response to execution of the continuous delivery pipeline model.

In step 212, the non-disruptive continuous delivery system generates continuous delivery model execution results, and compares the results with a threshold condition (step 214). For example, the execution results can include a percentage of tests, functions, and/or other operations defined by the continuous delivery model that were successfully passed (e.g., 80%), and the threshold condition may define a minimum pass rate (e.g., 100%) required to successfully complete the continuous delivery pipeline model.

In step 216, the non-disruptive continuous delivery system determines if execution of the continuous delivery pipeline model succeeds or fails based on the comparison. For example, if the execution results satisfy the threshold condition, then the application, or portion thereof, associated with the continuous delivery pipeline model can be deployed to a production system (step 218). If the execution results fail to satisfy the threshold condition, the software may not be deployed to the production system, and an alert may be generated (step 220).

Figure 3:
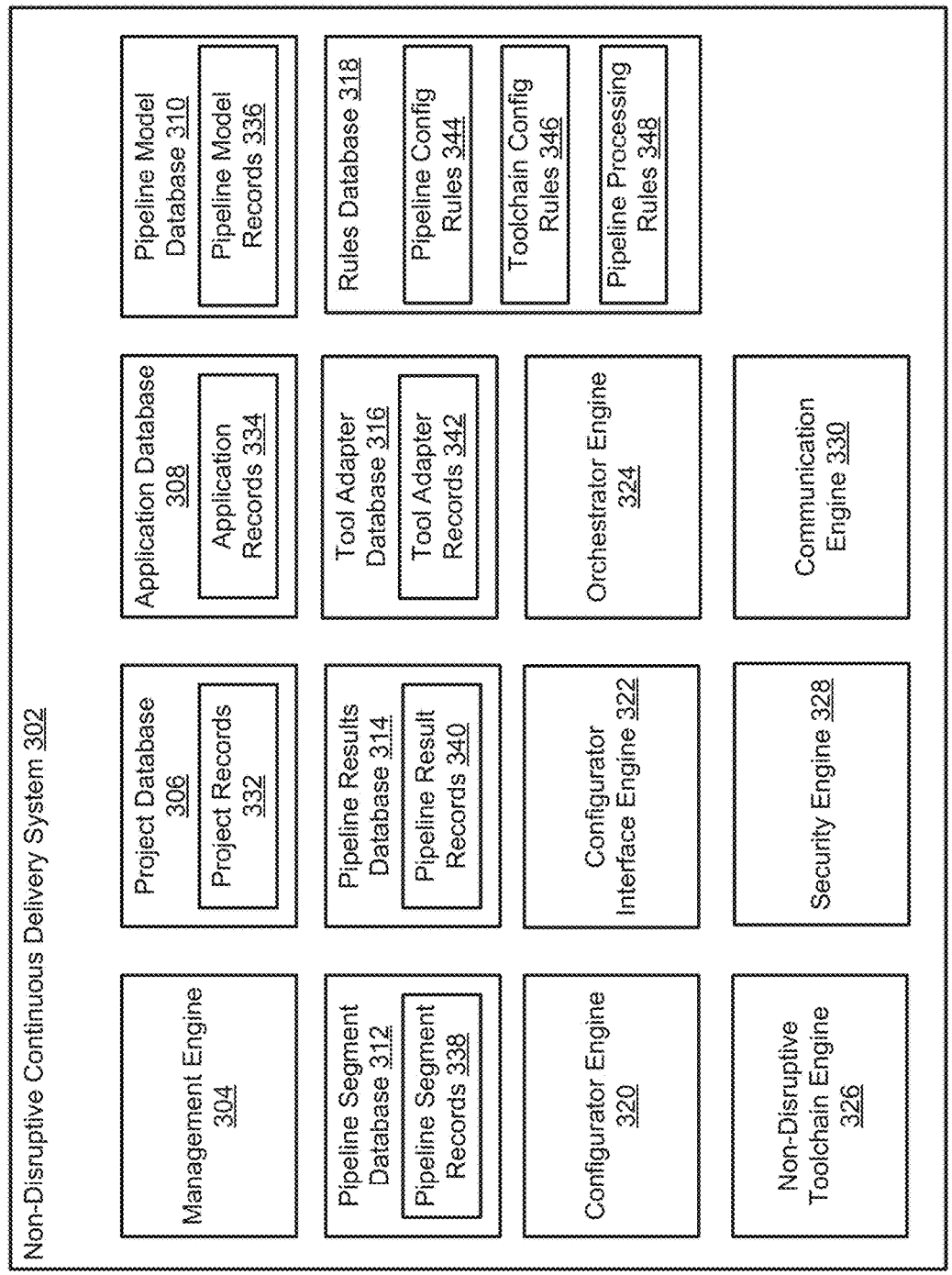
FIG. 3 depicts a block diagram of an example of a non-disruptive continuous delivery system according to some embodiments.

FIG. 3 depicts a block diagram 300 of an example of a non-disruptive continuous delivery system 302 according to some embodiments. Generally, the non-disruptive continuous delivery system 302 functions to continuously integrate, build, test, and deploy projects and/or applications. The continuous delivery system 302 includes a management engine 304, a project database 306, an application database 308, a pipeline model database 310, a pipeline segment database 312, a pipeline results database 314, a tool adapter database 316, a rules database 318, a configurator engine 320, a configurator interface engine 322, an orchestrator engine 324, a non-disruptive toolchain engine 326, a security engine 328, and a communication engine 330.

In the example of FIG. 3, the management engine 304 is configured to manage (e.g., create, read, update, delete, or otherwise access) project records 332 stored in the project database 306, application records 334 stored in the application database 308, pipeline model records 336 stored in the pipeline model database 310, pipeline segment records 338 stored in the pipeline segment database 312, pipeline result records 340 stored in the pipeline results database 314, tool adapter records 342 stored in the tool adapter database 316, and rules 344-348 stored in the rules database 318. The management engine 304 may perform any of these operations manually (e.g., by an administrator interacting with a GUI) and/or automatically (e.g., by one or more of the engines 320-330). In a specific implementation, the management engine 304 comprises a library of executable instructions which are executable by a processor for performing any of the aforementioned management operations. The databases 306-318 may be any structure and/or structures suitable for storing the records 332-342 and/or the rules 344-348 (e.g., an active database, a relational database, a table, a matrix, an array, a flat file, and the like).

In the example of FIG. 3, the project records 332 may each include a variety of attributes and values associated with a project. For example, a project may comprise an online music store platform being developed in accordance with the teachings herein. In a specific implementation, the project records 332 store some or all of the following data:

Project Identifier: an identifier (e.g., a key or UID) that identifies the stored project.

Project Name: name of the stored project (e.g., online music store platform).

Application(s): one or more applications associated with the stored project. For example, an application may include a particular feature (e.g., selecting a music genre) of the stored project.

Rule(s): one or more rules (e.g., rules 344-348) associated with the stored project.

Tool(s): one or more tools (e.g., Jenkins, Stash, Bitbucket, Gitlab, Github, etc.) associated with the project.

Permissions: permissions required to access the stored project. For example, permissions may be based on a user role (e.g., "developer," "administrator," etc.), a user-by-user basis, and so forth.

Timestamp(s): time/date information for associated CRUD operations performed on the stored project record, e.g., Project Online Music Store created on 2016-05-01 @ 1:30 PM.

In the example of FIG. 3, the application records 334 may each include a variety of attributes and values associated with an application of a project. For example, an application may comprise a genre selection feature of an online music store platform project being developed in accordance with the teachings herein. In a specific implementation, the application records 334 store some or all of the following data:

Application Identifier: an identifier (e.g., a key or UID) that identifies the stored application.

Application Name: name of the stored application (e.g., music genre selection).

Project: project associated with the stored application.

Tool(s): one or more tools (e.g., Stash, Bitbucket, etc.) associated with the application.

Continuous Delivery Pipeline Model(s): one or more continuous delivery pipeline model(s) associated with the stored application.

Rule(s): one or more rules (e.g., rules 344-348) associated with the stored application.

Permissions: permissions required to access the stored application. For example, permissions may be based on a user role (e.g., "developer," "administrator," etc.), a user-by-user basis, and so forth.

Timestamp(s): time/date information for associated CRUD operations performed on the stored application record, e.g., "Application Music Genre Selection Application created on 2016-05-01 @ 1:35 PM."

In the example of FIG. 3, the pipeline model records 336 may each include a variety of attributes and values associated with a continuous delivery pipeline model. For example, a continuous delivery pipeline model may comprise a model (e.g., data model and/or function model) for continuously integrating, building, testing, and deploying an application or project. In a specific implementation, the continuous delivery pipeline model comprises a node graph (e.g., directed node graph) model. In various implementations, the pipeline model records 336 store some or all of the following data:

Pipeline Model Identifier: an identifier (e.g., a key or UID) that identifies the stored continuous delivery pipeline model.

Template or Custom: indicates whether the continuous delivery pipeline model is a template model or a custom build model.

Pipeline Model Name: name of the stored continuous delivery pipeline model.

Application(s): one or more applications associated with the stored continuous delivery pipeline model.

Project(s): one or more projects associated with the stored continuous delivery pipeline model.

Pipeline Segment(s): one or more pipeline segment(s) included in the stored continuous delivery pipeline model.

Segment Dependencies: pipeline segment dependencies included in the stored continuous delivery pipeline model. For example, a second pipeline segment (e.g., an FT pipeline segment) can depend on an execution result (e.g., a pass value) of a first pipeline segment (e.g., a CI pipeline segment).

Rule(s): one or more rules (e.g., rules 344-348) associated with the stored continuous delivery pipeline model.

Permissions: permissions required to access the stored continuous delivery pipeline model. For example, permissions can be based on a user role (e.g., "developer," "administrator," etc.), a user-by-user basis, and so forth.

Timestamp(s): Time/date information for associated CRUD operations performed on the stored continuous delivery pipeline model. For example, timestamp information can be generated when a CRUD operation is performed, e.g., creating the continuous delivery pipeline model, executing the continuous delivery pipeline model, etc.

In the example of FIG. 3, the pipeline segment records 338 may each include a variety of attributes and values associated with a continuous delivery model pipeline segment (or, "pipeline segment"). For example, a pipeline segment can comprise a CI segment, a FT segment, a UAT segment, a PT segment, a SSC segment, a DSS segment, an SI segment, a PROD segment, and the like. In various implementations, pipeline segments can be executed in different environments (e.g., an AWS environment or other cloud computing environment), For example, a CI pipeline segment of a continuous delivery pipeline model may be executed in a first environment, and an FT pipeline segment of the same continuous delivery pipeline model may be executed in a different environment. In a specific implementation, the pipeline segment records 338 store some or all of the following data:

Segment Identifier: an identifier (e.g., a key or UID) that identifies the stored segment.

Segment Type: the type of segment stored in the segment record, e.g., CI segment, a FT segment, a UAT segment, a PT segment, a SSS segment, a DSS segment, an SI segment, a PROD, etc.

Event(s): event(s) associated with the stored segment, e.g., a "Start Event" that may be triggered when a pipeline segment is triggered during execution of a continuous delivery pipeline model, an "End Event" that may triggered upon completed "Start Event" of a pipeline segment execution, and so forth.

Task(s): tasks (or, "actions") associated with the stored pipeline segment and/or event (e.g., Start Event). Tasks may be triggered during an execution of a continuous delivery pipeline model including the stored pipeline segment. For example, an action associated with a CI pipeline segment type can include cloning a source code repository. When a task is triggered, it may cause associated tool(s) to perform the task(s).

Dependencies: identifies dependencies of the stored segment type. For example, an FT segment may require input from a CI segment. Accordingly, an alert may be generated if a user attempts to create a continuous delivery pipeline model that includes a segment type that requires input from a particular pipeline segment not currently included in the continuous delivery pipeline model.

Task Sequence: an execution sequence of the task(s).

Rule(s): rules associated with the stored pipeline segment, e.g., rules 344-348.

In the example of FIG. 3, the pipeline result records 340 may each include a variety of attributes and values associated with results of continuous delivery pipeline model executions (or, "runs"). In a specific implementation, the pipeline result records 340 store some or all of the following data:

Result Identifier: an identifier (e.g., a key or UID) that identifies the stored result record.

Continuous Delivery Pipeline Model: the continuous delivery pipeline model that generated the result record.

Project: the project associated with the continuous delivery pipeline model.

Application: the application associated with the continuous delivery pipeline model.

Overall Result: an overall result of execution of the continuous delivery pipeline model. For example, an overall result can be a qualitative value (e.g., "Pass" or "Fail"), and/or a quantitative value (e.g., percentage value).

Segment Results: a result of execution of the segments of the continuous delivery pipeline model. For example, an overall result can be a qualitative value (e.g., "Pass," "Fail," or "Not Executed"), and/or a quantitative value (e.g., percentage value).

Event Results: a result of execution of the events of the continuous delivery pipeline model. For example, an overall result can be a qualitative value (e.g., "Pass," "Fail," or "Not Executed"), and/or a quantitative value (e.g., percentage value).

Task Results: a result of execution of the tasks of the continuous delivery pipeline model. For example, an overall result can be a qualitative value (e.g., "Pass," "Fail," or "Not Executed"), and/or a quantitative value (e.g., percentage value).

Timestamps: time/date information for the stored results. For example, timestamp information can indicate when a continuous delivery pipeline model execution started, when a continuous delivery pipeline model execution ended, as well as timestamp data for event results, segment results, and task results.

In the example of FIG. 3, the tool adapter records 342 may each include a variety of attributes and values associated with a tool adapter. In a specific implementation, a tool adapter allows the system 302 to execute, and otherwise communicate with, different types of tools, regardless of the tool implementation. In a specific implementation, the tool adapter records 342 store some or all of the following data:

Tool Adapter Identifier: an identifier (e.g., a key or UID) that identifies the stored tool adapter.

Tool Type: the type of tool. For example, tool types can include a source code repository tool, a binary repository tool, an issue tracking tool, a project management tool, and/or a code quality tool.

Tool Implementation: the particular tool implementation (e.g., Stash).

Rule(s): one or more rules (e.g., rules 344-348) associated with the stored tool adapter.

Continuous Delivery Pipeline Model Configuration Rules 344

In the example of FIG. 3, the continuous delivery pipeline model configuration rules 344 (or, "pipeline model configuration rules") define attributes, functions, and/or conditions for configuring and generating continuous delivery pipeline models. In a specific implementation, the rules 344 specify, identify, and/or define a model (e.g., node graph model) to use for continuously integrating, building, testing, and deploying projects and applications. The rules 344 may further define input values, output values, and dependencies for the continuous delivery pipeline model.

In a specific implementation, the rules 344 define conditions for selecting a particular pipeline segment when creating a continuous delivery pipeline model. For example, the rules 344 may require a particular start segment (e.g., CI segment) and/or a particular end segment (e.g., PROD) when creating a particular continuous delivery pipeline model. Similarly, the rules 344 may include segment dependencies. In a specific implementation, the rules 344 may dynamically determine which pipeline segments are available for selection at a given point during the pipeline configuration. For example, for an "empty" pipeline, the rules 344 may only allow the CI segment to be selected, but after the CI segment is selected, one or more other segments may become available for inclusion in the continuous delivery pipeline model.

In a specific implementation, the rules 344 permit manual definition of some or all segment dependencies within a continuous delivery pipeline model in response to user input. For example, a user may select an FT segment, a PT segment, and define that the PT segment depends on the FT segment for a particular continuous delivery pipeline model.

In a specific implementation, the rules 344 permit automatic definition of some or all segment dependencies within a continuous delivery pipeline model without requiring dependency-specific input from a user. For example, the rules 344 may define a set of dependencies for each segment such that the system 302 may infer a particular dependency for a particular combination of segments. For example, if a pipeline includes a CI segment and an FT segment and a PROD segment, the rules may allow the system 302 to infer that the FT segment depends on the CI segment, and the PROD segment depends on the CI segment without requiring input from a user specifying such dependencies.

In a specific implementation, the rules 344 define one or more sets of template continuous delivery pipeline models (or, "template models"). For example, template models can be associated with one or more objectives or requirements, e.g., (no-fault tolerance system, cloud-based system, etc.), and the rules 344 may instruct the system 302 to present particular set(s), or subset(s), of template models in response to a user input.

Toolchain Configuration Rules 346

In the example of FIG. 3, the toolchain configuration rules 346 define attributes, functions, and/or conditions for configuring a set of tools to generate a toolchain. In a specific implementation, the rules 346 allow the system 302 to automatically configure tools without requiring input from a user. For example, the rules 344 can include predefined configuration data for each available tool (e.g., Stash, Bitbucket, Jenkins, etc.).

In the example of FIG. 3, the configurator engine 320 may be configured to execute the pipeline model configuration rules 344 and the toolchain configuration rules 346. Thus, for example, the configurator engine 320 may generate and configure various projects (e.g., the projects stored in the project records 332), applications (e.g., the applications stored in the application records 334), and continuous delivery pipeline models (e.g., the models stored in the records 336).

In the example of FIG. 3, the configurator interface engine 322 is configured to generate graphical user interfaces for interacting with the configurator engine 320 and other features of the system 302 (e.g., databases 306-316). For example, the configurator interface engine 322 can generate interfaces for creating projects, applications, and continuous delivery pipeline models. Similarly, in some implementations, the configurator interface engine 322 can generate displays for presenting pipeline execution results. An example interface that may be generated by the configurator interface engine 322 is shown in FIG. 12.

Continuous Delivery Pipeline Model Processing Rules 348

In the example of FIG. 3, the continuous delivery pipeline model processing rules 348 define attributes, functions, and/or conditions for executing continuous delivery pipeline models. In a specific implementation, the rules 348 define trigger events. Trigger events can cause an execution of a continuous delivery pipeline model. For example, a trigger event can include a source code commit event.

In a specific implementation, the rules 348 define overall pipeline threshold conditions for determining whether to deploy a project or application to a production system. For example, an overall threshold pipeline condition can be a qualitative condition (e.g., "pass," or "fail") and/or a quantitative condition, such as greater or less than a predetermined value (e.g., 100%). Accordingly, an overall threshold condition may be satisfied if 100% of the pipeline segments within a particular continuous pipeline model execution are passed.

In a specific implementation, the rules 348 define pipeline segment threshold conditions for determining whether a continuous delivery pipeline model execution is advanced to a next pipeline segment or terminated. For example, a pipeline segment threshold condition can be a qualitative condition (e.g., "pass," or "fail") and/or a quantitative condition, such as greater or less than a predetermined value (e.g., 100%). Accordingly, a pipeline segment threshold condition may be satisfied if 100% of the events and/or tasks within a particular pipeline segment execution are passed.

In a specific implementation, the rules 348 define pipeline segment gate conditions (or, "quality gate conditions") for determining whether a continuous delivery pipeline model execution is advanced to a next pipeline segment, terminated, or held. The gate condition can be in addition to, or instead of, other conditions (e.g., pipeline segment threshold conditions). For example, a gate condition may require an administrator, or other user with sufficient privileges, to approve a pipeline advancement prior to actually advancing an execution of the continuous delivery pipeline model. For example, a PROD segment may require an administrator to approve application deployment prior to deploying the application to a production system.

In a specific implementation, a pipeline segment can include one or more quality gate conditions, and/or quality gate conditions can include different condition types. The quality gates conditions may be used to determine whether an application is promoted to a next stage or next segment. For example, a pipeline segment can include one or more quality gate conditions, and the condition types can include critical conditions, non-critical conditions, and/or the like. Each condition type can be associated with a threshold value and/or value range (collectively, "value"). For example, critical condition types may be associated with a 100% pass rate in order for the continuous delivery pipeline model to advance to the next pipeline segment, while a non-critical condition type may be associated with a 90% pass rate in order for the continuous delivery pipeline model to advance to the next pipeline segment.

In a specific implementation, the rules 348 define events associated with pipeline segments. For example, events may include some or all of the following:

Event ID: an identifier (e.g., a key or UID) that identifies the event.

Pipeline Segment: an associated segment and/or segment type.

Project: an associated project.

Application: an associated application.

Status: a status of the event execution, e.g., completed, not started, in progress.

Result: a result of the event execution, e.g., pass, fail, 90% passed, 10% failed, etc.

Event Threshold Condition: a condition that must be satisfied for the event to pass.

Timestamp: date/time information the event was executed.

In a specific implementation, event attribute values may be stored in one or more databases (e.g., pipeline model database 310, pipeline segment database 312, and/or pipeline results database 314).

In a specific implementation, the rules 348 define tasks associated with pipeline segments. For example, tasks may include some or all of the following:

Task ID: an identifier (e.g., a key or UID) that identifies the task.

Action(s): one or more actions.

Tool Type: the type of tool to perform the action.

Status: a status of the task, e.g., completed, not started, in progress, etc.

Result: a result of the task, e.g., pass, fail, etc.

Task Threshold Condition: a condition that must be satisfied the task to pass.

Timestamp: date/time information task was executed.

In a specific implementation, task attribute values may be stored in one or more databases (e.g., pipeline model database 310, pipeline segment database 312, and/or pipeline results database 314).

In the example of FIG. 3, the orchestrator engine 324 is configured to execute the continuous delivery pipeline model processing rules 348. Thus, for example, the orchestrator engine 324 can determine trigger events, trigger execution of continuous delivery pipeline models, determine and execute events, tasks, and/or actions (collectively, "actions"), identify tool types to perform the actions, determine execution results, determine whether to advance, terminate, or hold an execution of a continuous delivery model, and the like.

In the example of FIG. 3, the non-disruptive toolchain engine 326 is configured to trigger execution of one or more tools. In a specific implementation, the engine 326 utilizes tool adapters to trigger execution of the one or more tools regarding of tool implementations. For example, each tool can be associated with a tool adapter, and the engine 326 can trigger actions of a particular tool using a corresponding tool adapter. Accordingly, when a continuous delivery pipeline model is executed, the engine 326 can interface with other components of the system 302 to trigger actions of the appropriate corresponding tools without the other components requiring tool implementation-specific information. This can also permit, for example, changing of tools without substantially interrupting operation of the system 302, since the other components do not require tool implementation-specific information.

In the example of FIG. 3, the security engine 328 is configured to authenticate access to the non-disruptive continuous delivery system 302. For example, the security engine 328 can compare permissions of an associated project, application, continuous delivery pipeline, etc., with the permissions of a user before allowing the user to modify, execute, or otherwise access the associated project, application, continuous delivery pipeline, etc. In a specific implementation, the security engine 328 can also be configured to provide encryption, decryption, or other security measures for the non-disruptive continuous delivery system 302. For example, the security engine 328 can encrypt data messages transmitted from the system 302 and decrypt data messages received at the system 302.

In the example of FIG. 3, the communication engine 330 functions to send requests to and receive data from one or a plurality of systems. The communication engine 330 can send requests to and receive data from a system through a network or a portion of a network. Depending upon implementation-specific or other considerations, the communication engine 330 can send requests and receive data through a connection, all or a portion of which can be a wireless connection. The communication engine 330 can request and receive messages, and/or other communications from associated systems.

Figure 4:
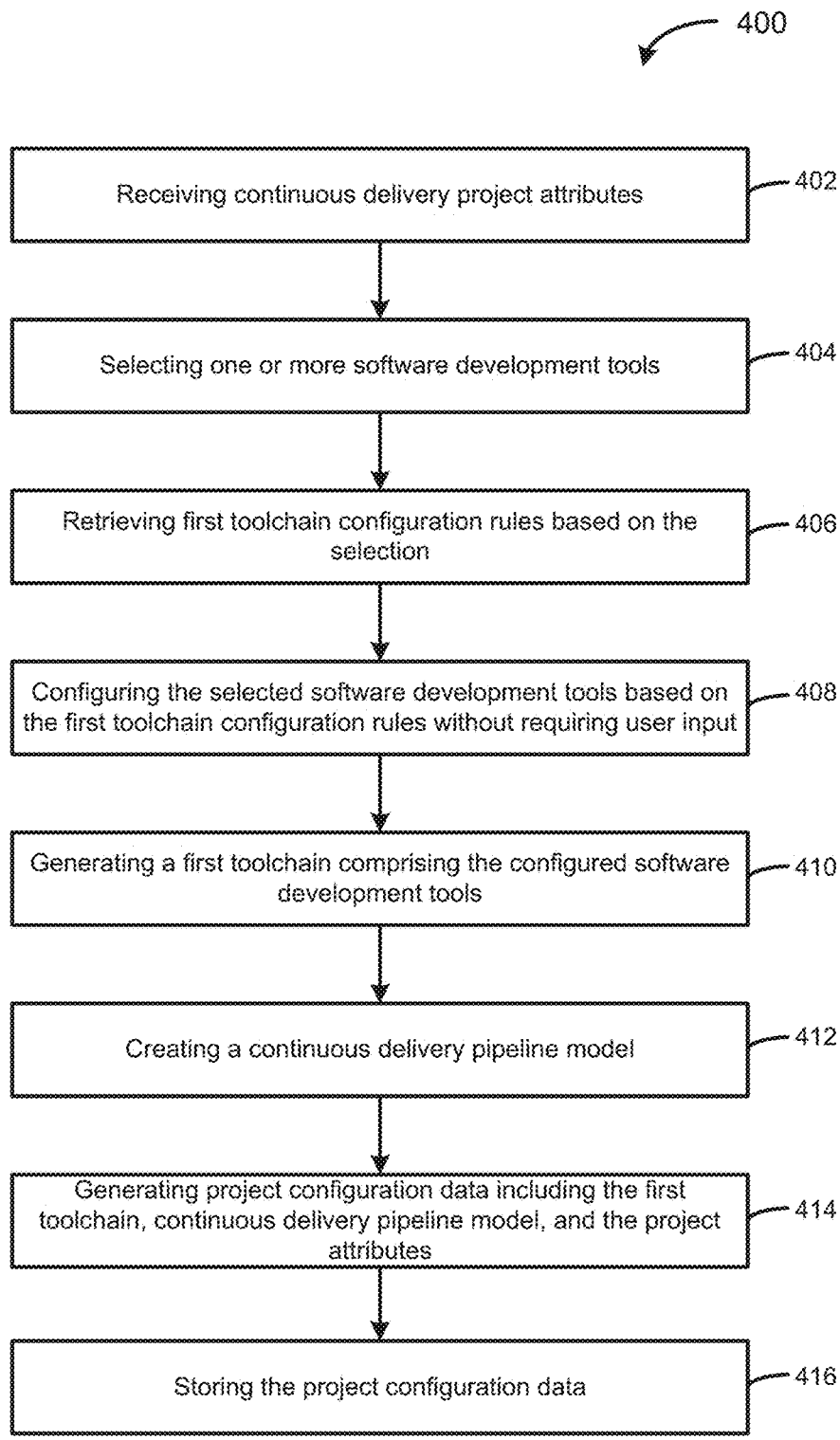
FIG. 4 depicts a flowchart of an example method of operation of a non-disruptive continuous delivery system for generating and configuring a project and application according to some embodiments.

FIG. 4 depicts a flowchart 400 of an example method of operation of a non-disruptive continuous delivery system for generating and configuring a project and a project application according to some embodiments.

In step 402, the non-disruptive continuous delivery system receives continuous delivery project (or, "project") attributes. For example, the attributes can be based on user input (e.g., a project name) received through a graphical user interface, and/or generated by the non-disruptive continuous delivery system (e.g., a project key) in response to user input. In a specific implementation, a configurator interface engine receives the project attributes.

In step 404, the non-disruptive continuous delivery system selects one or more software development tools (or, "tools"). For example, the tools can be selected based on user input (e.g., "Stash") received through the graphical user interface, and/or automatically generated by the non-disruptive continuous delivery system (e.g., based on a default set of tool selections).

In step 406, the non-disruptive continuous delivery system retrieves one or more first toolchain configuration rules based on the tool selections. For example, the rules may comprise predefined implementation-specific tool configurations. In a specific implementation, a configurator engine retrieves the rules from a rules database.

In step 408, the non-disruptive continuous delivery system configures the selected tools based on the first toolchain configuration rules without requiring user input. In a specific implementation, the configurator engine performs such "automatic" tool configurations. In step 410, the non-disruptive continuous delivery system generates a first toolchain comprising the configured tools.

In step 412, the non-disruptive continuous delivery system creates a continuous delivery pipeline model. In a specific implementation, the configurator engine creates the continuous delivery pipeline model based on, and in response to, user input received by the configurator interface engine through the graphical user interface.

In step 414, the non-disruptive continuous delivery system generates project configuration data comprising the project attributes, first toolchain, and the continuous delivery pipeline model. In step 416, the non-disruptive continuous delivery system stores the project configuration data. In a specific implementation, the project configuration data is stored in one or more databases, e.g., a project database, a pipeline model database, and/or a pipeline segment database.

Figure 5:
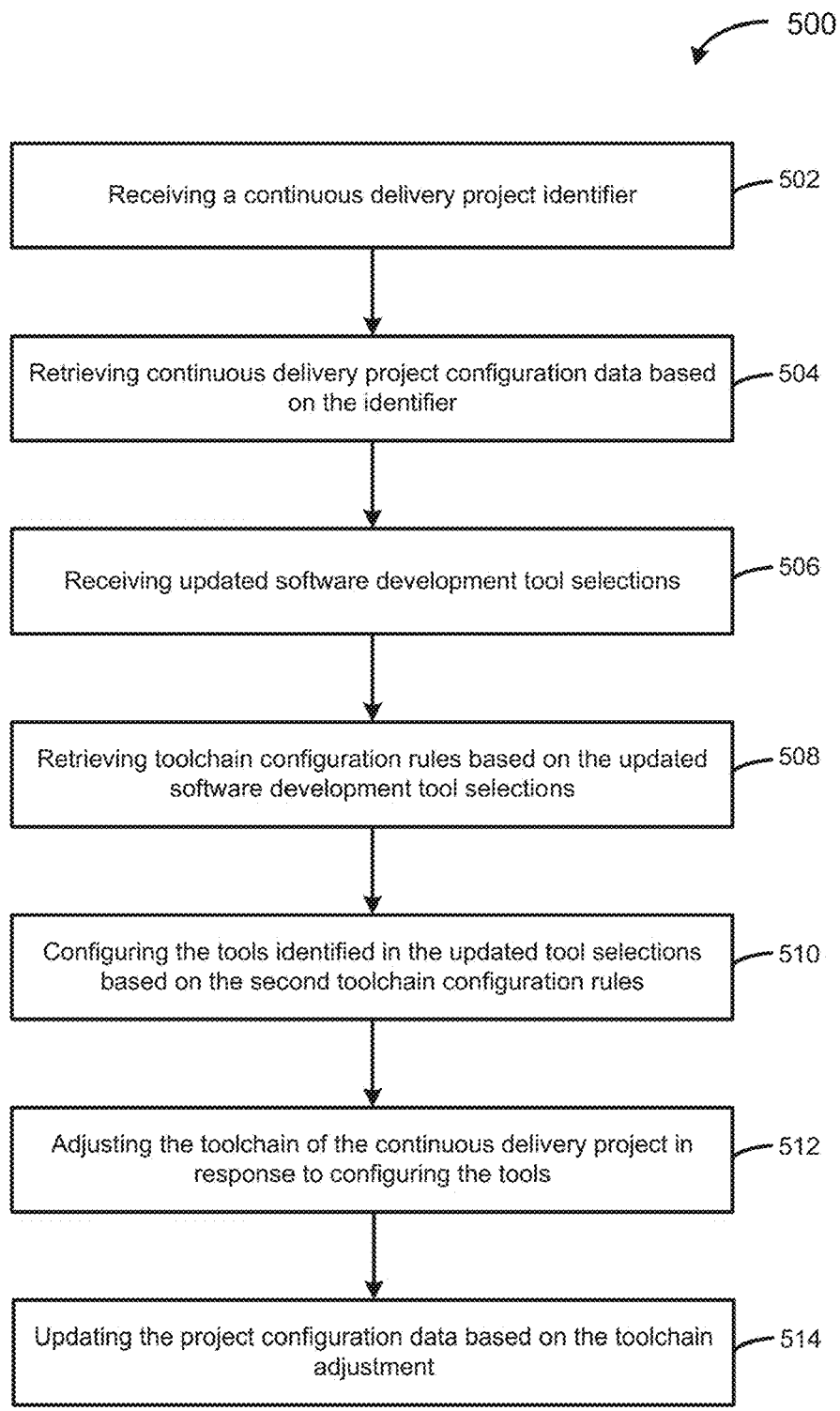
FIG. 5 depicts a flowchart of an example method of operation of a non-disruptive continuous delivery system for adjusting a project and application configuration according to some embodiments.

FIG. 5 depicts a flowchart 500 of an example method of operation of a non-disruptive continuous delivery system for adjusting a project and application configuration according to some embodiments.

In step 502, a non-disruptive continuous delivery system receives a continuous delivery project (or, "project") identifier. For example, the identifier can be received in response to user input (e.g., a project name) received through a graphical user interface, and/or received in response to a request by a component (e.g., a configurator engine) of the non-disruptive continuous delivery system. In a specific implementation, a configurator interface engine receives the project attributes.

In step 504, the non-disruptive continuous delivery system retrieves project configuration data based on the identifier. In a specific implementation, the configurator engine retrieves the project configuration data from one or more databases, e.g., a project database, application database, and/or pipeline model database.

In step 506, the non-disruptive continuous delivery system receives updated software development tool (or, "tool") selections. For example, the updated tool selections can be based on user input received through the graphical user interface, and/or generated by the non-disruptive continuous delivery system. In a specific implementation, the configurator interface engine receives the updated tool selections.

In step 508, the non-disruptive continuous delivery system retrieves one or more toolchain configuration rules based on the updated tool selections. For example, the one or more toolchain configuration rules may comprise predefined implementation-specific tool configurations. In a specific implementation, a configurator engine retrieves the one or more toolchain configuration rules from a rules database.

In step 510, the non-disruptive continuous delivery system configures the updated tools based on the toolchain configuration rules without requiring user input. In a specific implementation, the configurator engine performs such "automatic" tool configurations.

In step 512, the non-disruptive continuous delivery system adjusts the toolchain of the project in response to configuring the tools. In a specific implementation, the configurator engine performs the adjustment.

In step 514, the non-disruptive continuous delivery system updates the project configuration data based on the toolchain adjustment. In a specific implementation, the configurator engine performs the update.

Figure 6:
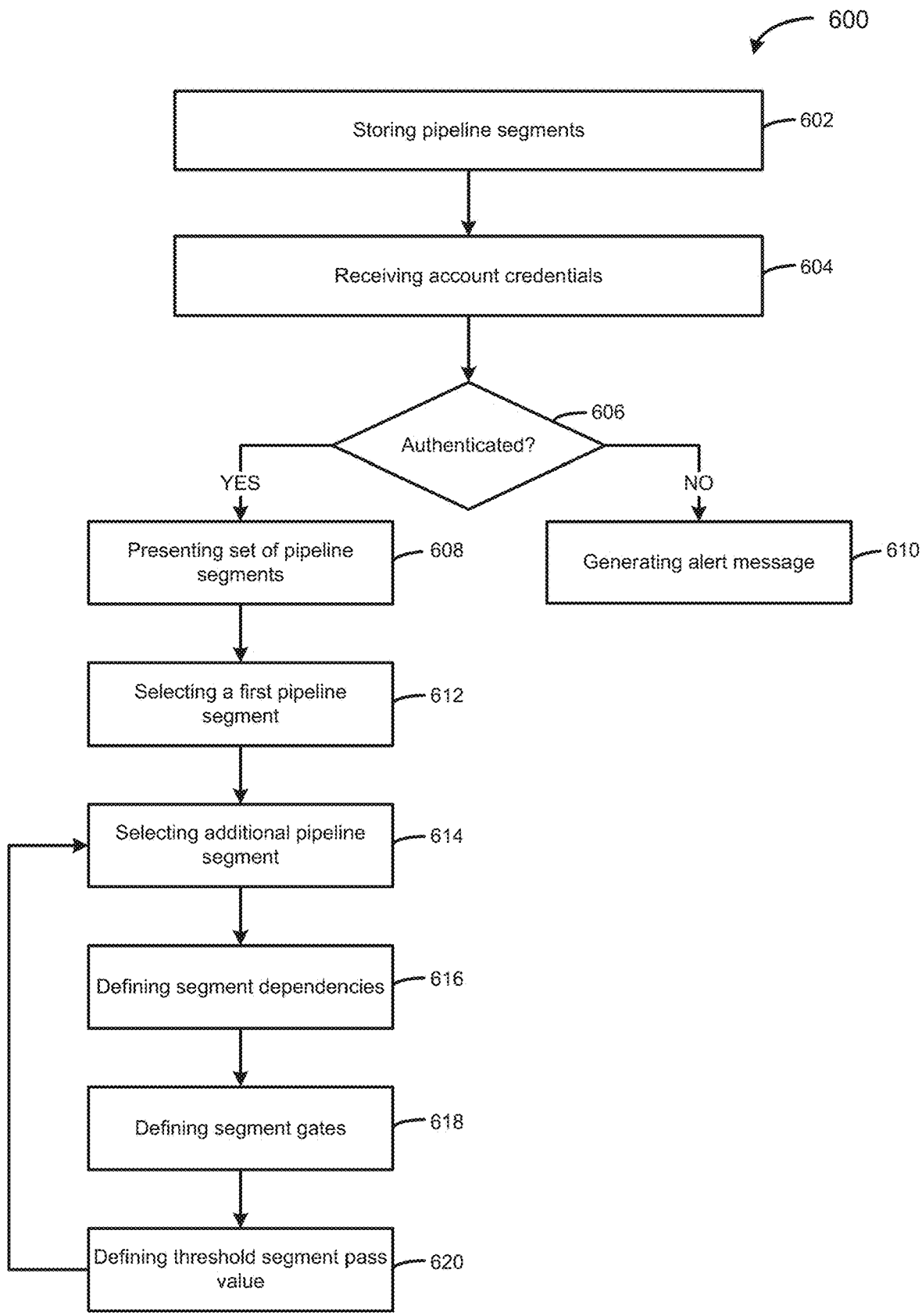
FIG. 6 depicts a flowchart of an example method of operation of a non-disruptive continuous delivery system for creating a continuous delivery pipeline model according to some embodiments.

FIG. 6 depicts a flowchart 600 of an example method of operation of a non-disruptive continuous delivery system for creating a continuous delivery pipeline model according to some embodiments.

In step 602, a non-disruptive continuous delivery system stores a plurality of pipeline segments. In a specific implementation, the plurality of pipeline segments are stored in a pipeline segment database.

In step 604, the non-disruptive continuous delivery system receives account credentials (e.g., a username and password). In a specific implementation, the account credentials are received through a graphical user interface generated by a configurator interface engine.

In step 606, the non-disruptive continuous delivery system attempts to authenticate the account credentials. If the authentication is successful, a set of pipeline segments are presented (step 608). For example, the pipeline segments can be presented through the graphical user interface by the configurator interface engine. Alternatively, if the authentication fails, the method may terminate and generate an alert message indicating a failed authentication (step 610). In a specific implementation, a security engine performs the authentication.

In step 612, the non-disruptive continuous delivery system selects a first pipeline segment. In a specific implementation, the first pipeline segment is selected from a set of available (or, "candidate") pipeline segments. For example, the first pipeline segment can be selected based on, and in response to, user input received through the graphical user interface generated by the configurator interface engine.

In step 614, the non-disruptive continuous delivery system selects an additional pipeline segment. In a specific implementation, the additional pipeline segment is selected from the set of candidate pipeline segments. For example, the additional pipeline segment can be selected based on, and in response to, an additional user input received through the graphical user interface generated by the configurator interface engine.

In step 616, the non-disruptive continuous delivery system defines one or more segment dependencies between the additional pipeline segment and the first pipeline segment. For example, a segment dependency may define that the additional pipeline segment can only execute if the first pipeline segment is successfully completed. By way of further example, the segment dependency may define that the additional pipeline segment receives as input the output of the first pipeline segment. In a specific implementation, a configurator engine defines the segment dependency.

In step 618, the non-disruptive continuous delivery system defines one or more segment gate conditions for the first pipeline segment and/or the additional pipeline segment. For example, the segment gate conditions can include requiring administrator approval to advance to subsequent pipeline segments. In a specific implementation, the configurator engine generates the gate conditions based on one or more rules. In a specific implementation, the configurator interface engine defines the gate conditions based on user input received through the graphical user interface.

In step 620, the non-disruptive continuous delivery system defines one or more segment threshold conditions for the first pipeline segment and the second pipeline segment. For example, the segment threshold conditions can be generated by the configurator engine based on one or more rules. In a specific implementation, the configurator interface engine defines one or more of the the segment threshold conditions based on user input received through the graphical user interface generated by the configurator interface engine. It will be appreciated that one or more of the steps 614-620 can be repeated until the continuous delivery pipeline model is completed.

Figure 7:
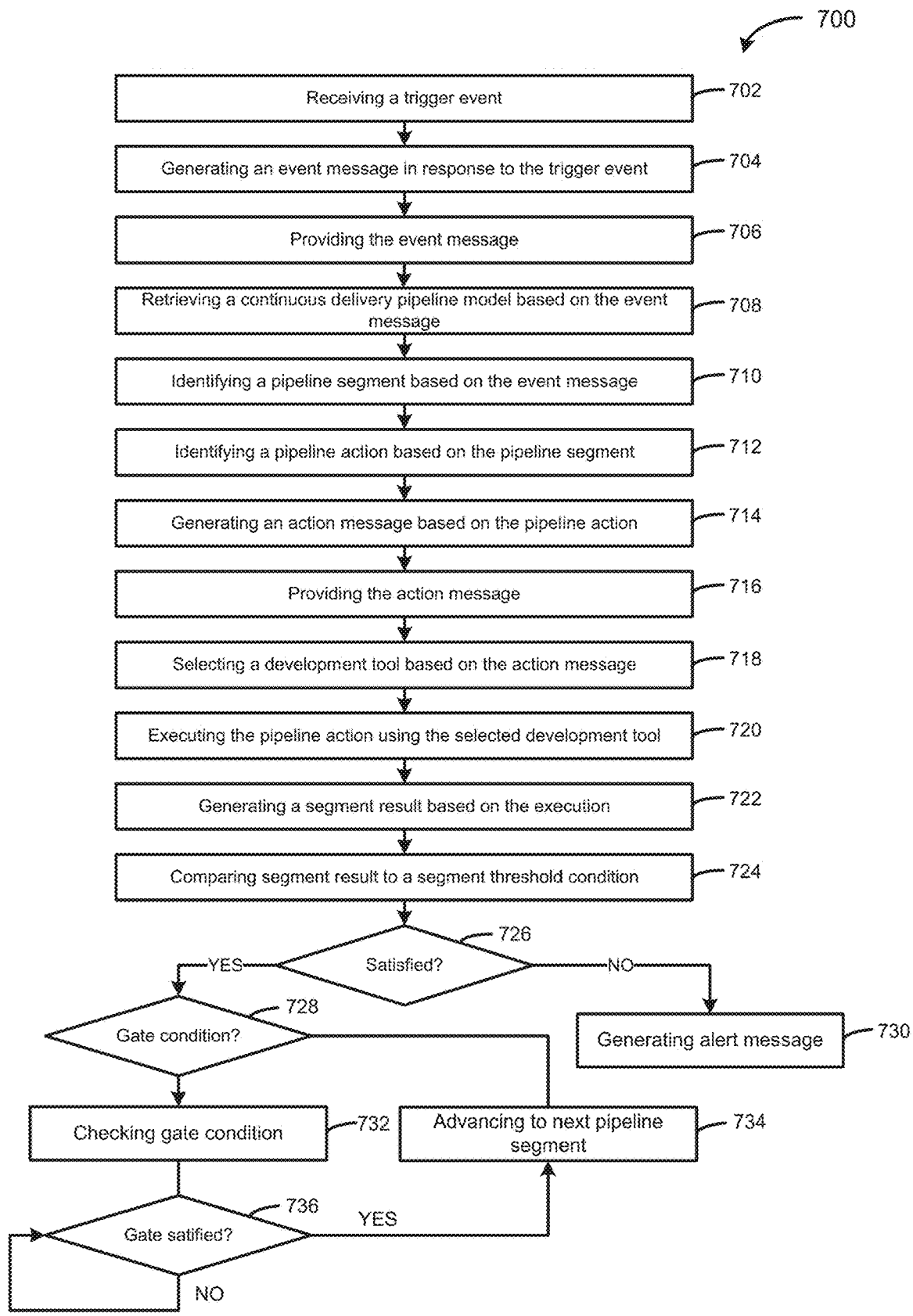
FIG. 7 depicts a flowchart of an example method of operation of a non-disruptive continuous delivery system for executing a continuous delivery pipeline model according to some embodiments.

FIG. 7 depicts a flowchart 700 of an example method of operation of a non-disruptive continuous delivery system for executing a continuous delivery pipeline model according to some embodiments.

In step 702, a non-disruptive continuous delivery system receives a trigger event (e.g., a source code commit event). For example, the trigger event can be received by a toolchain engine from a client system and/or software development tool (or, "tool").

In step 704, the non-disruptive continuous delivery system generates an event in response to the trigger event. In a specific implementation, the event is generated by a non-disruptive toolchain engine.

In step 706, the non-disruptive continuous delivery system provides the event. In a specific implementation, the event is provided to an orchestrator engine.

In step 708, the non-disruptive continuous delivery system retrieves a continuous delivery pipeline model based on the event. In a specific implementation, a configurator engine retrieves the continuous delivery pipeline model from a pipeline database.

In step 710, the non-disruptive continuous delivery system identifies a pipeline segment based on the event. In a specific implementation, the orchestrator engine identifies the pipeline segment.

In step 712, the non-disruptive continuous delivery system identifies an action based on the pipeline segment. In a specific implementation, the orchestrator engine identifies the pipeline segment.

In step 714, the non-disruptive continuous delivery system generates an action message based on the action. In a specific implementation, the orchestrator engine generates the action message.

In step 716, the non-disruptive continuous delivery system provides the action message. In a specific implementation, the orchestrator engine provides the action message to the non-disruptive toolchain engine.

In step 718, the non-disruptive continuous delivery system selects one or more tools based on the action message. In a specific implementation, the toolchain engine selects the one or more tools.

In step 720, the non-disruptive continuous delivery system triggers execution of the action using the selected one or more tools. In a specific implementation, the orchestrator engine triggers the non-disruptive toolchain engine to instruct the selected tools to perform the action.

In step 722, the non-disruptive continuous delivery system generates a pipeline segment execution result based on the execution. In a specific implementation, the orchestrator engine generates the segment execution result.

In step 724, the non-disruptive continuous delivery system compares the segment execution result with a threshold condition. In a specific implementation, the orchestrator engine performs the comparison.

In step 726, the non-disruptive continuous delivery system, if the condition is satisfied, determines if any gate conditions are defined for the pipeline segment (step 728). Alternatively, if the condition is not satisfied, the process is terminated and an alert message is generated indicating the threshold conditions was not satisfied (step 730). In a specific implementation, the orchestrator engine performs the determination and generates the alert message.

In step 732, if there is a defined gate condition for the pipeline segment, the non-disruptive continuous delivery system checks the gate condition. In a specific implementation, the orchestrator engine checks the gate condition.

In step 734, if a gate condition is not defined for the pipeline segment, the non-disruptive continuous delivery system advances to the next pipeline segment of the continuous delivery pipeline model. In a specific implementation, the orchestrator engine advances the execution of the continuous delivery pipeline model to the next pipeline segment.

In step 736, if the gate condition is satisfied, the non-disruptive continuous delivery system advances to the next pipeline segment (step 734). If the condition is not satisfied, step 736 can be repeated until satisfied.

Figure 8:
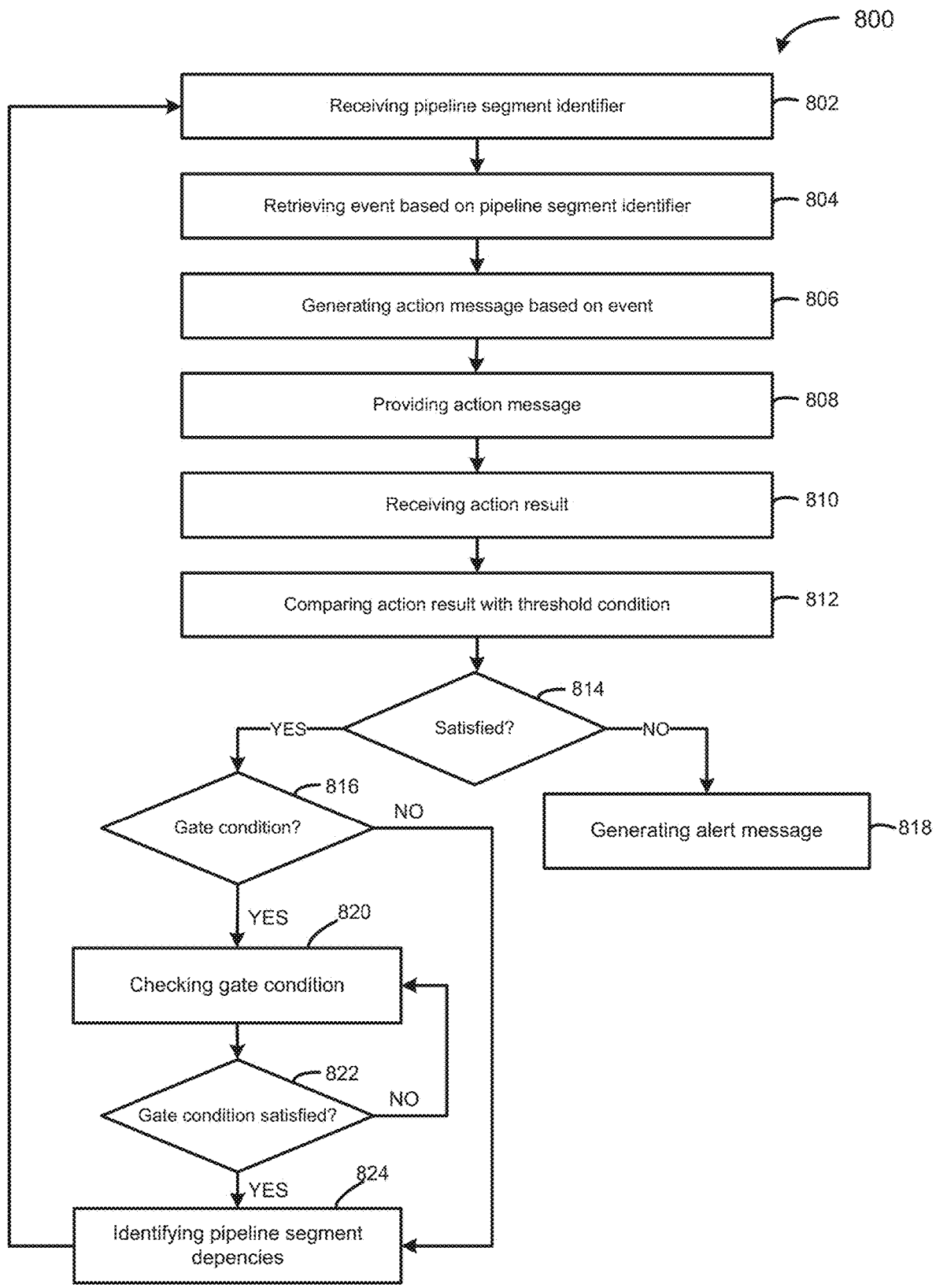
FIG. 8 depicts a flowchart of an example method of operation of a non-disruptive continuous delivery system for executing a pipeline segment of a continuous delivery pipeline model according to some embodiments.

FIG. 8 depicts a flowchart 800 of an example method of operation of a non-disruptive continuous delivery system for executing a pipeline segment of a continuous delivery pipeline model according to some embodiments.

In step 802, a non-disruptive continuous delivery system receives a pipeline segment identifier. In step 804, the non-disruptive continuous delivery system receives an event based on the pipeline segment identifier. In step 806, the non-disruptive continuous delivery system generates an action message based on the event. In step 808, the non-disruptive continuous delivery system provides the action message. In step 810, the non-disruptive continuous delivery system receives an action result. In step 812, the non-disruptive continuous delivery system compares the action result with a threshold condition (e.g., a pipeline segment threshold condition)

In step 814, if the threshold condition is satisfied, the non-disruptive continuous delivery system determines if any gate conditions are defined for the pipeline segment (step 816). Alternatively, if the threshold condition is not satisfied, the process is terminated and alert message is generated indicating the threshold conditions was not satisfied (step 818). In a specific implementation, the orchestrator engine performs the determination and generates the alert message.

In step 820, if there is a defined gate condition, the non-disruptive continuous delivery system checks the gate condition (step 822). In a specific implementation, the orchestrator engine checks the gate condition. If a gate condition is not defined, or if the gate condition defined and satisfied, the non-disruptive continuous delivery system identifies pipeline segment dependencies (step 824). In a specific implementation, the orchestrator engine identifies the pipeline segment dependencies. Steps 802-824 can be repeated until the execution is completed, terminated, and/or held.

Figure 9:
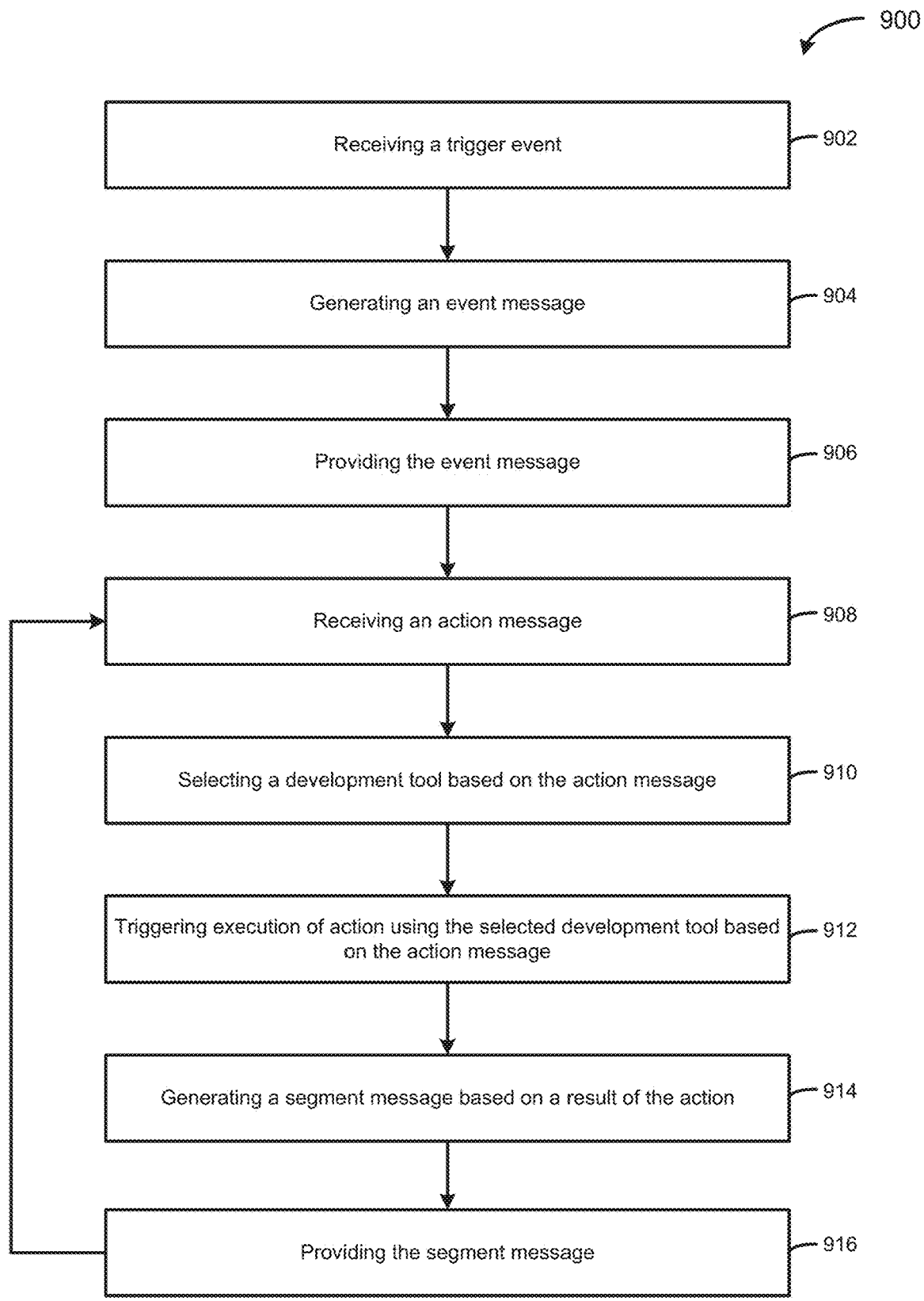
FIG. 9 depicts a flowchart of an example method of operation of a non-disruptive toolchain engine according to some embodiments.

FIG. 9 depicts a flowchart 900 of an example method of operation of a non-disruptive toolchain engine according to some embodiments.

In step 902, a non-disruptive toolchain engine receives a trigger event. In step 904, the non-disruptive toolchain engine generates an event message in response to the trigger event. In step 906, the non-disruptive toolchain engine provides the event message (e.g., to an orchestrator engine). In step 908, the non-disruptive toolchain engine receive an action message (e.g., from an orchestrator engine). In step 910, the non-disruptive toolchain engine selects a tool based on the action message. In step 912, the non-disruptive toolchain engine triggers execution of an action by the selected tool based on the action message. In step 914, the non-disruptive toolchain engine generates a segment message based on a result of the action execution. In step 916, the segment event message is provided (e.g., to the orchestrator engine). It will be appreciated that steps 908-916 can be repeated until pipeline execution has completed, terminated, and/or held.

Figure 10:
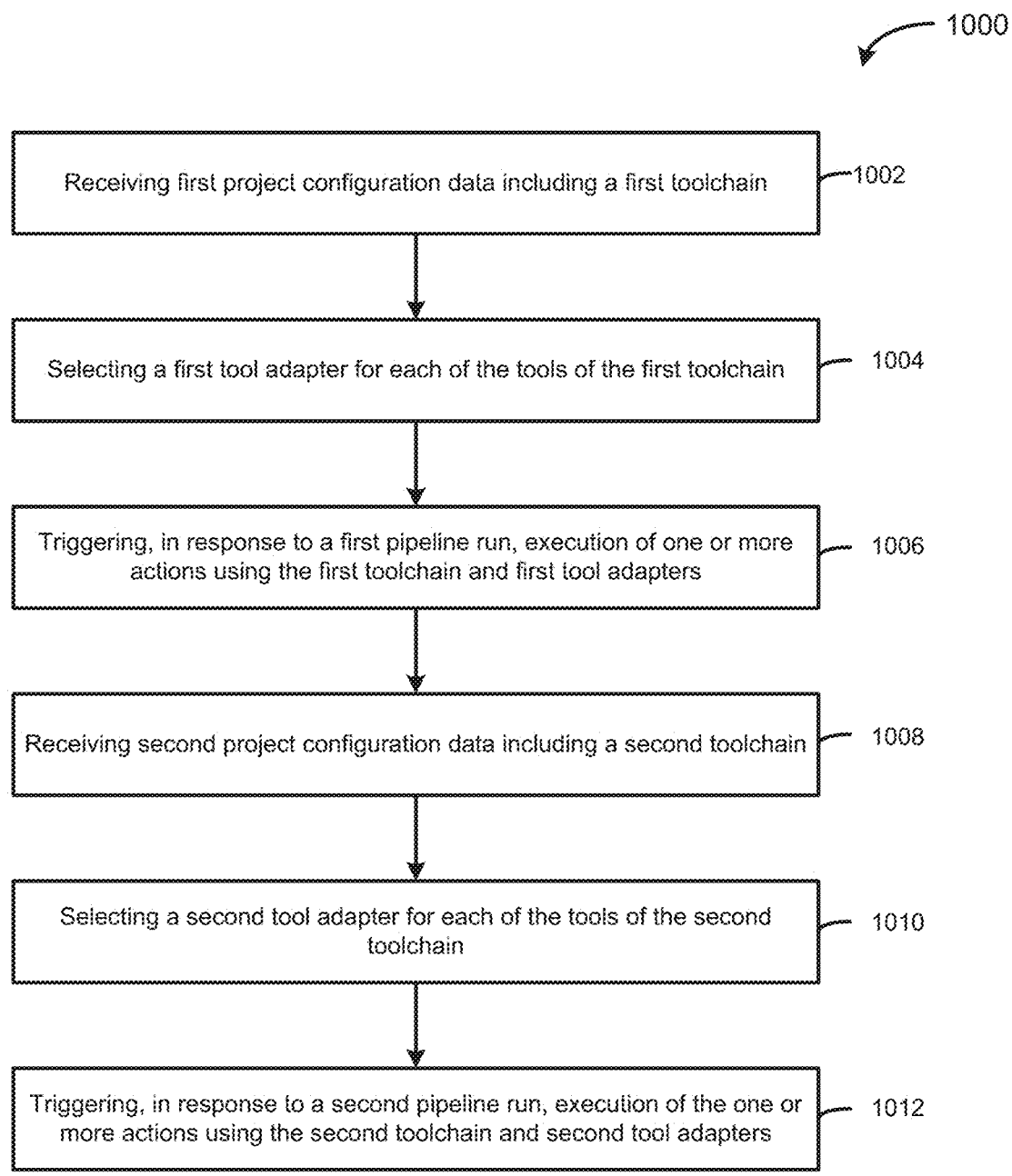
FIG. 10 depicts a flowchart of an example method of operation of a non-disruptive toolchain engine according to some embodiments.

FIG. 10 depicts a flowchart 1000 of an example method of operation of a non-disruptive toolchain engine according to some embodiments.

In step 1002, a non-disruptive toolchain engine receives first project configuration data including a first toolchain. In step 1004, the non-disruptive toolchain engine selects a first tool adapter for each of the tools of the first toolchain. In step 1006, the non-disruptive toolchain engine, in response to a first execution (or, "run") of a continuous delivery pipeline model, triggers the first toolchain to execute one or more actions using the first tool adapters. In step 1008, the non-disruptive toolchain engine receives second project configuration including a second toolchain. In step 1010, the non-disruptive toolchain engine selects a second tool adapter for each of the tools of the second toolchain. In step 1012, the non-disruptive toolchain engine, in response to a second run of the continuous delivery pipeline model, triggers the second toolchain to execute the one or more actions using the second tool adapters.

Figure 11:
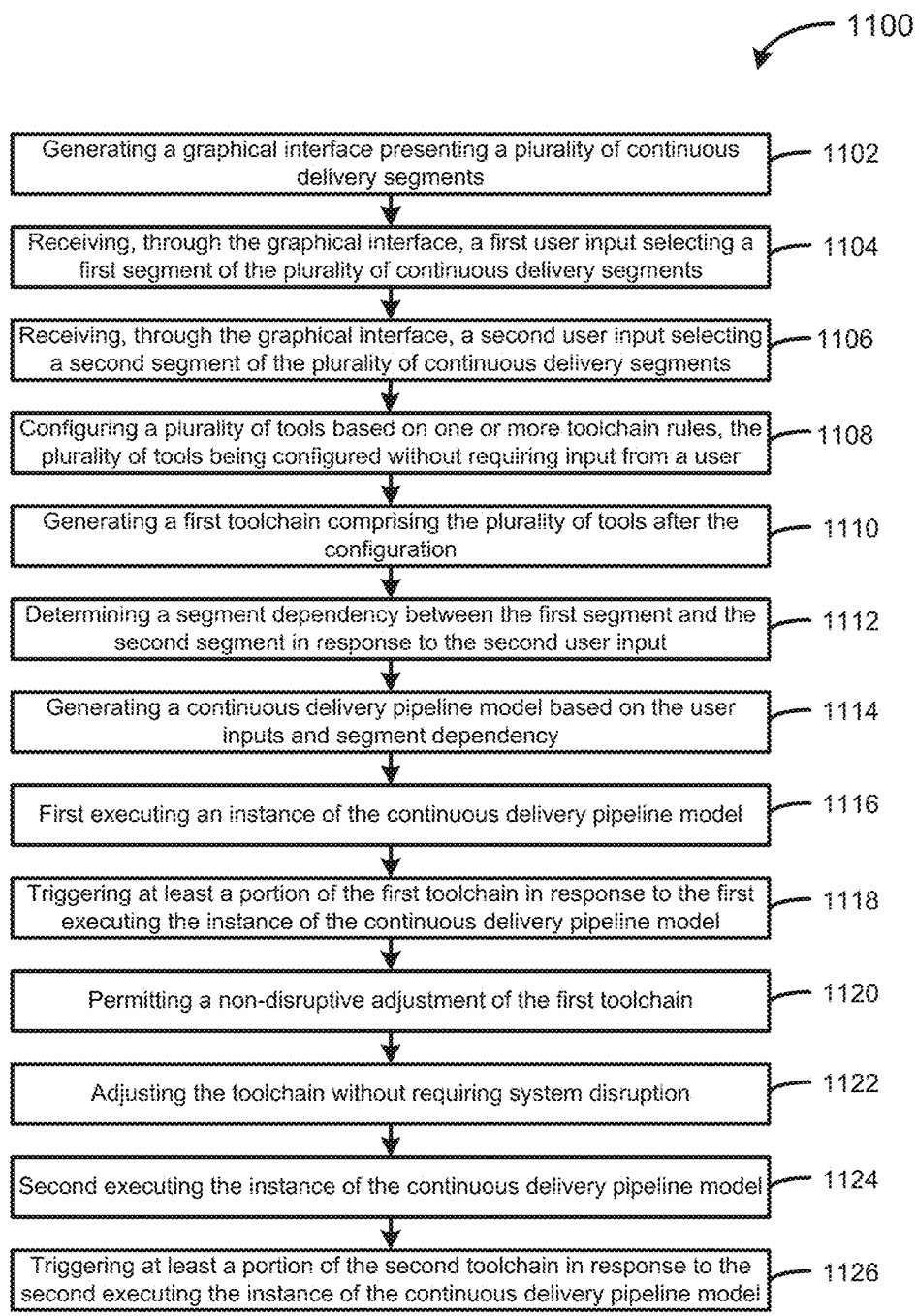
FIG. 11 depicts a flowchart of an example method of operation of a non-disruptive continuous delivery system according to some embodiments.

FIG. 11 depicts a flowchart 1100 of an example method of operation of a non-disruptive continuous delivery system according to some embodiments.

In step 1102, a non-disruptive continuous delivery system generates a graphical interface presenting a plurality of continuous delivery segments. In a specific implementation, a configurator interface engine generates the graphical interface.

In step 1104, the non-disruptive continuous delivery system receives, through the graphical interface, a first user input selecting a first segment of the plurality of continuous delivery segments. In a specific implementation, the configurator interface engine receives the first user input.

In step 1106, the non-disruptive continuous delivery system receives, through the graphical interface, a second user input selecting a second segment of the plurality of continuous delivery segments. In a specific implementation, the configurator interface engine receives the second user input.

In step 1108, the non-disruptive continuous delivery system configures a plurality of tools based on one or more toolchain rules, the plurality of tools being configured without requiring input from a user. In a specific implementation, a configurator engine configures the tools.

In step 1110, the non-disruptive continuous delivery system generates a first toolchain comprising the plurality of tools after the configuration. In a specific implementation, the configurator engine generates the first toolchain.

In step 1112, the non-disruptive continuous delivery system determines a segment dependency between the first segment and the second segment. In a specific implementation, the configurator engine determines the segment dependency in response to the second user input.

In step 1114, the non-disruptive continuous delivery system generates a continuous delivery pipeline model based on the first user input, the second user input, and the segment dependency, the continuous delivery pipeline model including at least the first segment and the second segment. In a specific implementation, the configurator engine generates the continuous delivery pipeline model.

In step 1116, the non-disruptive continuous delivery system executes an instance of the continuous delivery pipeline model. In a specific implementation, an orchestrator engine executes the instance of the continuous delivery pipeline model.

In step 1118, the non-disruptive continuous delivery system triggers at least a portion of the first toolchain to perform a continuous delivery action associated with the continuous delivery pipeline model in response to the executing the instance of the continuous delivery pipeline model. In a specific implementation, a non-disruptive toolchain engine performs the triggering.

In step 1120, the non-disruptive continuous delivery system permits a non-disruptive adjustment of the first toolchain. In a specific implementation, the non-disruptive toolchain engine permits the non-disruptive adjustment.

In step 1122, the non-disruptive continuous delivery system adjusts the toolchain without requiring system disruption, thereby generating a second toolchain. In a specific implementation, the configurator engine adjusts the toolchain.

In step 1124, the non-disruptive continuous delivery system second executes the instance of the continuous delivery pipeline model. In a specific implementation, the orchestrator engine second executes the instance of the continuous delivery pipeline model.

In step 1126, the non-disruptive continuous delivery system triggers at least a portion of the second toolchain in response to the second executing the instance of the continuous delivery pipeline model. In a specific implementation, the non-disruptive toolchain engine performs the triggering.

FIG. 12 depicts an example graphical user interface 1200 for generating an example continuous delivery pipeline model 1202 according to some embodiments. The graphical user interface 1200 includes a continuous delivery pipeline model 1202 that is currently being created, a first pipeline segment 1204, a second pipeline segment 1206, a segment dependency 1208, and candidate pipeline segments 1210-1220. For example, the first segment 1204 and second segment 1206 may have been selected from the candidate pipeline segments 1210-1222 in response to user input received through the graphical user interface 1200. For example, the user input can include "dragging and dropping" pipeline segments from the candidate pipeline segments 1210-1222 to a palette portion 1224 of the interface 1200. The segment dependency 1208 may have been similarly defined in response to user input received through the graphical user interface 1200. Alternatively, the segment dependency 1208 may have been automatically defined, e.g., based on one or more pipeline configuration rules.

FIG. 13 depicts an example continuous delivery pipeline model 1300 according to some embodiments. The continuous delivery pipeline model 1300 includes pipeline segments 1302-1316 and segment dependencies 1318-1332. In a specific implementation, the continuous delivery pipeline model 1300 comprises a directed node graph model, and the pipeline segments 1302-1316 comprise nodes (or, vertices) of the directed node graph model, and the segment dependencies 1318-1332 comprise edges of the directed node graph model.

Figure 14:
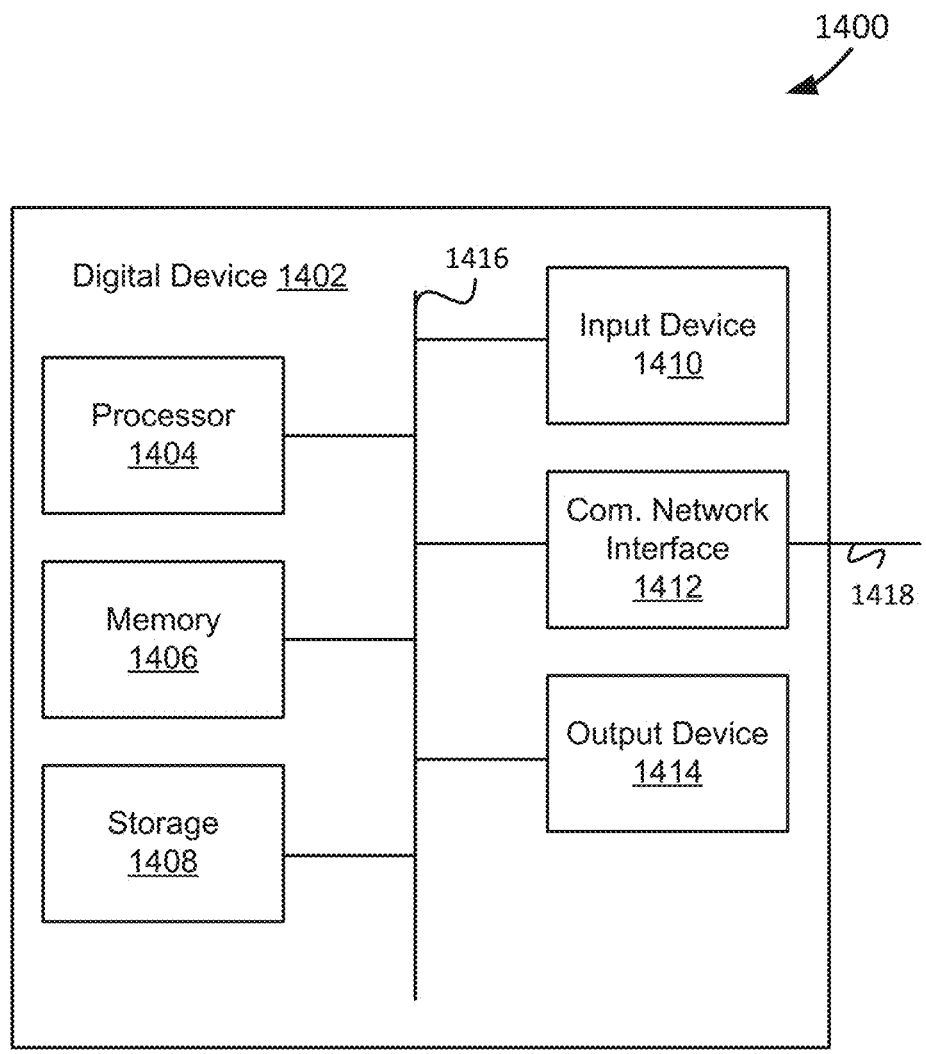
FIG. 14 depicts a block diagram of an example computing device according to some embodiments.

FIG. 14 depicts a block diagram 1400 of an example computing device 1402 according to some embodiments. Any of the client systems 102, non-disruptive continuous delivery system 104, development tools 106, production system 108, and communications network 110 may be an instance of one or more computing devices 1402. In the example of the FIG. 14, the computing device 1402 comprises a processor 1404, memory 1406, storage 1408, an input device 1410, a communications network interface 1412, and an output device 1414 communicatively coupled to a communication channel 1416. The processor 1404 is configured to execute executable instructions (e.g., programs). In some embodiments, the processor 1404 comprises circuitry or any processor capable of processing the executable instructions.

The memory 1406 stores data. Some examples of memory 1406 include storage devices, such as RAM, ROM, RAM cache, virtual memory, etc. In various embodiments, working data is stored within the memory 1406. The data within the memory 1406 may be cleared or ultimately transferred to the storage 1408.

The storage 1408 includes any storage configured to retrieve and store data. Some examples of the storage 1408 include flash drives, hard drives, optical drives, and/or magnetic tape. Each of the memory system 1406 and the storage system 1408 comprises a computer-readable medium, which stores instructions or programs executable by processor 1404.

The input device 1410 is any device that inputs data (e.g., mouse and keyboard). The output device 1414 outputs data (e.g., a speaker or display). For example, the output device 1414 can be one or more a cathode ray tube (CRT) device or liquid crystal display (LCD) devices. It will be appreciated that the storage 1408, input device 1410, and output device 1414 may be optional. For example, the routers/switchers may comprise the processor 1404 and memory 1406 as well as a device to receive and output data (e.g., the communications network interface 1412 and/or the output device 1414).

The communications network interface 1412 may be coupled to a network (e.g., network 108) via the link 1418. The communications network interface 1412 may support communication over an Ethernet connection, a serial connection, a parallel connection, and/or an ATA connection. The communications network interface 1412 may also support wireless communication (e.g., 1402.11 a/b/g/n, WiMax, LTE, WiFi). It will be apparent that the communications network interface 1412 can support many wired and wireless standards.

It will be appreciated that the hardware elements of the computing device 1402 are not limited to those depicted in FIG. 14. A computing device 1402 may comprise more or less hardware, software and/or firmware components than those depicted (e.g., drivers, operating systems, touch screens, etc.). Further, hardware elements may share functionality and still be within various embodiments described herein. In one example, encoding and/or decoding may be performed by the processor 1404 and/or a co-processor located on a GPU (i.e., NVidia).

It will be appreciated that an "engine," "device," "tool," "system," and/or "database" may comprise software, hardware, firmware, and/or circuitry. In one example, one or more software programs comprising instructions capable of being executable by a processor may perform one or more of the functions of the engines, devices, tools, systems, and/or databases described herein. In another example, circuitry may perform the same or similar functions. Alternative embodiments may comprise more, less, or functionally equivalent engines, devices, tools, systems, and/or databases, and still be within the scope of present embodiments. For example, as previously discussed, the functions of the various engines, devices, tools, systems, and/or databases may be combined or divided differently.

The engines described in this paper, or the engines through which the systems and devices described in this paper can be implemented, can be cloud-based engines. As used in this paper, a cloud-based engine is an engine that can run applications and/or functionalities using a cloud-based computing system. All or portions of the applications and/or functionalities can be distributed across multiple computing devices, and need not be restricted to only one computing device. In some embodiments, the cloud-based engines can execute functionalities and/or modules that end users access through a web browser or container application without having the functionalities and/or modules installed locally on the end-users' computing devices.

As used in this paper, databases are intended to include repositories having any applicable organization of data, including tables, comma-separated values (CSV) files, traditional databases (e.g., SQL), or other applicable known or convenient organizational formats. Databases can be implemented, for example, as software embodied in a physical computer-readable medium on a specific-purpose machine, in firmware, in hardware, in a combination thereof, or in an applicable known or convenient device or system. Database-associated components, such as database interfaces, can be considered "part of" a database, part of some other system component, or a combination thereof, though the physical location and other characteristics of database-associated components is not critical for an understanding of the techniques described in this paper.

Databases can include data structures. As used in this paper, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure. The databases, described in this paper, can be cloud-based databases. A cloud based database is a database that is compatible with cloud-based computing systems and engines.

The present invention(s) are described above with reference to example embodiments. It will be apparent to those skilled in the art that various modifications may be made and other embodiments can be used without departing from the broader scope of the present invention(s). Therefore, these and other variations upon the example embodiments are intended to be covered by the present invention(s).

The invention claimed is:

1. A method performed by a non-disruptive continuous software delivery system operating on one or more computer systems, each computer system having at least one processor and a memory, the method comprising:
   presenting a plurality of continuous delivery segments in a user interface;
   receiving a first user input selecting a first segment of the plurality of continuous delivery segments;
   receiving a second user input selecting a second segment of the plurality of continuous delivery segments;
   configuring a plurality of tools based on one or more toolchain rules, the plurality of tools being configured without requiring input from a user;
   generating a first toolchain comprising the plurality of tools after the configuration;
   determining a segment dependency between the first segment and the second segment in response to the second user input;
   generating a continuous delivery pipeline model based on the first user input, the second user input, and the segment dependency, the continuous delivery pipeline model including at least the first segment and the second segment;
   executing an instance of the continuous delivery pipeline model;
   triggering at least a portion of the first toolchain to perform a continuous delivery action associated with the continuous delivery pipeline model in response to the executing the instance of the continuous delivery pipeline model;
   in response to receiving a third user input, retrieving one or more toolchain configuration rules;
   automatically reconfiguring one or more of the plurality of tools based on the retrieved one or more configuration rules; and
   performing an adjustment to the toolchain in response to the automatically reconfiguring one or more of the plurality of tools.

2. The method of claim 1, further comprising:
   adjusting, by the non-disruptive continuous software delivery system, the toolchain without requiring system disruption, thereby generating a second toolchain;
   second executing, by the non-disruptive continuous delivery system, the instance of the continuous delivery pipeline model; and
   triggering, by the non-disruptive continuous delivery system, at least a portion of the second toolchain in response to the second executing the instance of the continuous delivery pipeline model.

3. The method of claim 1, wherein the continuous delivery pipeline model comprises a directed node graph.

4. The method of claim 3, wherein the first segment comprises a first node of the directed node graph, and the second segment comprises a second node of the directed node graph.

5. The method of claim 4, wherein a first edge of the directed node graph comprises the segment dependency between the first segment and the second segment.

6. The method of claim 5, further comprising:
   displaying a visual representation of the directed node graph in response to receiving the second user input.

7. The method of claim 1, wherein the segment dependency is determined based on a third user input received through the user interface.

8. The method of claim 1, wherein the segment dependency is determined without requiring user input.

9. A computer system comprising the at least one processor and the memory, wherein the memory has instructions stored thereon that are executed by the at least one processor and cause the computer system to perform the method of claim 1.

10. A computer system comprising the at least one processor and the memory, wherein the memory has instructions stored thereon that are executed by the at least one processor and cause the computer system to perform the method of claim 2.

11. A computer system comprising the at least one processor and the memory, wherein the memory has instructions stored thereon that are executed by the at least one processor and cause the computer system to perform the method of claim 3.

12. A computer system comprising the at least one processor and the memory, wherein the memory has instructions stored thereon that are executed by the at least one processor and cause the computer system to perform the method of claim 4.

13. A computer system comprising the at least one processor and the memory, wherein the memory has instructions stored thereon that are executed by the at least one processor and cause the computer system to perform the method of claim 5.

14. A computer system comprising the at least one processor and the memory, wherein the memory has instructions stored thereon that are executed by the at least one processor and cause the computer system to perform the method of claim 6.

15. A non-transitory computer readable medium having instructions stored thereon, wherein the instructions are executed by the least one processor and cause the at least one processor to perform the method of claim 1.

16. A non-transitory computer readable medium having instructions stored thereon, wherein the instructions are executed by the least one processor and cause the at least one processor to perform the method of claim 2.

17. A non-transitory computer readable medium having instructions stored thereon, wherein the instructions are executed by the least one processor and cause the at least one processor to perform the method of claim 3.

18. A non-transitory computer readable medium having instructions stored thereon, wherein the instructions are executed by the least one processor and cause the at least one processor to perform the method of claim 4.

19. A non-transitory computer readable medium having instructions stored thereon, wherein the instructions are executed by the least one processor and cause the at least one processor to perform the method of claim 5.

20. A non-transitory computer readable medium having instructions stored thereon, wherein the instructions are executed by the least one processor and cause the at least one processor to perform the method of claim 6.

\* \* \* \* \*